United States Patent [19]

Murakami

[11] Patent Number: 4,472,066

[45] Date of Patent: Sep. 18, 1984

[54] DIGITAL ELECTRONIC TIMEPIECE

[75] Inventor: Tomomi Murakami, Tanashi, Japan

[73] Assignee: Citizen Watch Company Limited, Tokyo, Japan

[21] Appl. No.: 354,115

[22] Filed: Mar. 2, 1982

[30] Foreign Application Priority Data

Mar. 6, 1981 [JP] Japan .................................. 56-32242
Jun. 16, 1981 [JP] Japan .................................. 56-91503

[51] Int. Cl.$^3$ ......................... G04C 19/00; G06K 5/18

[52] U.S. Cl. ......................................... 368/82; 340/792

[58] Field of Search ..................................... 368/82–84, 368/239–242; 340/755, 792

[56] References Cited

U.S. PATENT DOCUMENTS 3,566,388 2/1971 Andrews et al. .................. 340/792
4,084,402 4/1978 Moyer ................................... 368/83
4,205,312 5/1980 Nelson .................................. 340/792
4,298,865 11/1981 Masuzana et al. .................. 340/792
4,303,996 10/1981 Schmitz .................................. 368/82
4,362,392 12/1982 Kumata .................................. 368/82
4,396,295 8/1983 Ishikawa ................................. 368/82

*Primary Examiner*—Vit W. Miska
*Attorney, Agent, or Firm*—Jordan and Hamburg

[57] ABSTRACT

A miniature digital electronic timepiece is disclosed which destroys time information in a continuously laterally shifting manner upon a matrix type display, such that more than one digit and less than two digits are visible at any particular instant. The category of information currently displayed, e.g. minutes or hours, is indicated by an identification mark, and the currently displayed digits can be halted and made completely visible, through size reduction, by actuation of a correction switch. Correction of the now stationary digits can then be accomplished by further switch actuation, so that time information correction is simple and rapid, even if only a single external operating member is utilized.

12 Claims, 15 Drawing Figures

DIGITAL ELECTRONIC TIMEPIECE

BACKGROUND OF THE INVENTION

The present invention relates to an extremely small electronic timepiece which can be utilized as a decorative accessory, such as a pendant or ring, and which provides a high degree of display visibility and ease of time correction, in spite of the small size of the timepiece.

There is at present a requirement for digital electronic timepieces of very small size, which can be incorporated into dress accessories such as pendants or rings. With a conventional type of digital electronic timepiece, various different categories of time information, such as hours, minutes, and in some cases seconds, or year, month, date, etc, are simultaneously displayed upon the timepiece face. Such an arrangement is satisfactory for an electronic timepiece of normal size. However, in the case of a highly miniaturized digital electronic timepiece, for use in a pendant or ring for example, the display area of the timepiece must be made much smaller than that of a conventional electronic timepiece. Thus, if it is attempted to show different categories of time information simultaneously on the timepiece display, for example the two digits indicating the minutes and the one or two digits indicating hours information, then the size of the display digits will become so small as to be very difficult for the user to read. It is possible to approach this problem by a method such as displaying only the minutes digits or hours digits at any one time, so that the user has to actuate a switch to change over to display of the information not being currently displayed. However such methods are highly inconvenient.

With a digital electronic timepiece according to the present invention, these problems are effectively solved, by providing a continuously laterally shifting display (referred to hereinafter simply as "display shifting"), whereby for example the digits indicating the hours of time information move across the timepiece display, followed by the digits indicating the minutes information, which disappear to be followed by the digits of hours information, and so on. With such a method, the size of the display digits can be made sufficiently large to ensure ease of reading the display, even if the electronic timepiece is made very small in size. In addition, as described hereinafter, correction of time information can be very simply and rapidly accomplished with a digital electronic timepiece according to the present invention, in spite of the small size of the timepiece, and even if only a single externally operated correction switch is incorporated. Thus, the present invention makes possible the manufacture of digital electronic timepieces of very small size which are at the same time highly practicable and can be produced at relatively low cost, due to the overall simplicity of the timepiece configuration.

SUMMARY OF THE DISCLOSURE

The present invention comprises a miniature digital electronic timepiece having a matrix type of display, across which time information digits are continuously and cyclically shifted. The inventor has found that maximum effectiveness of such a display is attained if the display range is such that more than one digit and less than two digits are visible at any one time, as the information shifts across the display. Thus, with such an electronic timepiece for example, the first digit of the tens of hours of time information would gradually appear and move across the display, from right to left, followed by the digit of the units of hours information, in turn followed by a colon, and then by the tens of minutes and units of minutes digits in succession, followed once more by the tens of hours and units of hours digits, and so on. However at any particular instant, the display range is such that only approximately one and one-half digits are being displayed. While this is occurring, an indication is given of the category of time information represented by the digits currently being displayed, e.g. indicating whether these digits represent hours or minutes, for example. In the described embodiments, this indication is provided by an identification mark which appears on the display, to indicate for example that minutes information is being displayed by forming the letter M, or the letter H in the case of hours information being displayed. However this indication of the category of information currently being displayed can be achieved by various other methods.

Correction of time information can be easily performed with such an electronic timepiece. For example, if it is desired to correct the hours of time information displayed by the timepiece, a correction switch can be actuated while the identification mark of the hours information is appearing. As described hereinafter, this switch actuation can be arranged to cause the display to become stationary, with the digits selected (e.g. the tens and units of hours, or minutes) being reduced in size so as to be fully visible on the display. The user can then perform correction of the information thus selected, by actuation of a switch (which may be the same as that used for selection of the information to be corrected). In this way, the continuously shifting display of information can be used as part of a correction selection function, in conjunction with an externally operable switch, and this selection and correction can be simply and rapidly performed. As will be made apparent by the embodiments described hereinafter, such a method of correction can be implemented using only a single correction switch. This is a very important factor in a miniature digital electronic timepiece, since the manufacturing cost is essentially determined by the amount of complexity involved in manufacturing and assembling mechanical components such as switches and pushbuttons. Thus, the capability for time correction using only a single switch is a major reason why such a timepiece can be manufactured at low cost, in spite of the very small size, and this capability is based upon the display shifting feature of the present invention.

It is also possible to arrange for an electronic timepiece according to the present invention to provide a display of decorative shapes, when this is designated by the user, and a number of different decorative shapes can be made to successively and cyclically alternate on the display. This can greatly enhance the market appeal of a digital electronic timepiece according to the present invention, when such a timepiece is incorporated into a dress accessory such as a ring or pendant, by providing a novel and attractive ornament.

DESCRIPTION OF THE PREFERRED EMBODIMENTS

Figure 1:
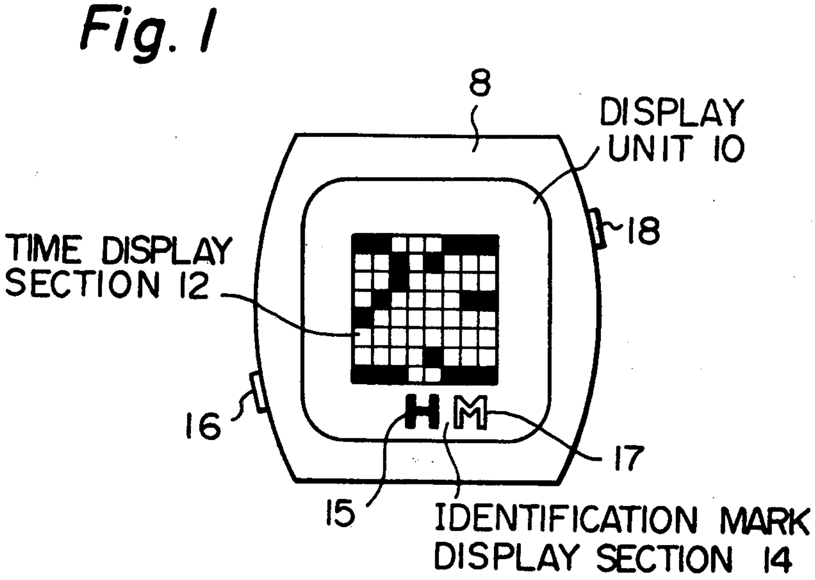
FIG. 1 is a plan view of a digital electronic timepiece according to the present invention.

Referring first to FIG. 1, a plan view is shown therein of an embodiment of a digital electronic timepiece according to the present invention. Reference numeral 10 denotes a display unit, which in this embodiment comprises a liquid crystal display cell. Numeral 12 denotes a time display section, comprising an 8 by 8 dot matrix array, which can display 1½ digits of time information in a normal time display mode of operation, and two digits in a correction mode of operation, as described hereinafter. Numeral 14 denotes an identification mark display section comprising a portion 15 in which the letter H is displayed to indicate that the time information currently appearing on time display section 12 consists of hours information, and a portion 17 in which the letter M can be displayed, to indicate that the digits currently appearing on time display section 12 consist of minutes information. Pushbuttons 16 and 18 are operable to actuate switches used for time correction purposes, as described hereinafter, with pushbutton 16 being actuated to designate a set of time information (e.g. minutes or hours information) which is to be corrected, while pushbutton 18 can then be actuated to thereby generate signals for correcting the time information set thus designated. Numeral 8 denotes the timepiece case.

Figure 2:
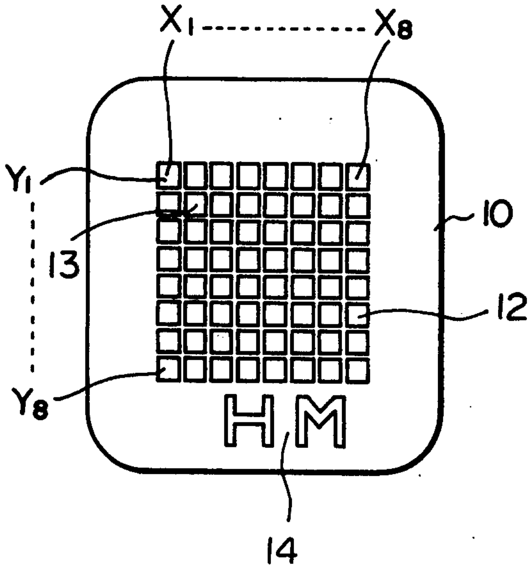
FIG. 2 is a plan view of a matrix type display unit used in the electronic timepiece example of FIG. 1.

FIG. 2 is an expanded plan view of the display unit 10 shown in FIG. 1. As shown, time display section 12 comprises a matrix display array comprising 8 rows ($y_1$ to $y_8$) and 8 columns ($x_1$ to $x_8$) of liquid crystal display elements. These display elements are driven by a corresponding set of 8 column electrodes, and a set of 8 row electrodes, such that when display drive signals are applied (as described hereinafter) to a row and a column electrode simultaneously, then the display element of time display section 12 which is situated at the intersection of the latter row and column electrodes will be made visible. For example, display element 13 is made visible when the row electrode and column electrode of row $y_2$ and column $x_2$ are driven simultaneously.

Figure 3:
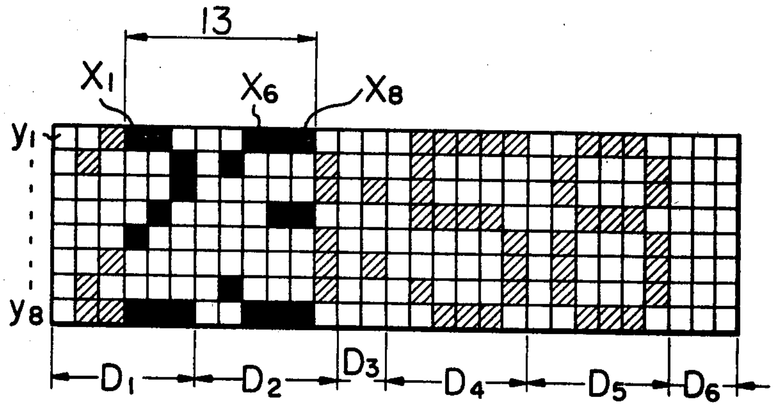
FIG. 3 is a diagram for assistance in describing the relationship between the display range of an electronic timepiece according to the present invention and time information digits.

With an electronic timepiece according to the present invention, time information is normally displayed in a continuously laterally shifting manner, with approximately 1½ digits being visible at any one instant. Thus, in the example of FIG. 1, a time of 23 hours is in the process of being indicated, with the digits 23 being shifted across time display section 12 from right to left. This shifting display function will now be described in greater detail, with reference to the expanded diagram of FIG. 3. In actual operation, as described above, the digits of time information are successively shifted across time display section 12, in the sequence tens of hours, units of hours, tens of minutes, units of minutes, tens of hours, . . . and so on, i.e. the time information is displayed cyclically. FIG. 3 shows how the time information thus displayed would appear if all of the time information were visible simultaneously, i.e if the display range was expanded such as to encompass all of the displayed time information, and not limited to the range denoted by numeral 13 in FIG. 3, i.e. a range which covers approximately 1½ display digits. In other words, the information shown in FIG. 3 is shifted cyclically across time display section 12 (although being updated once per minute). The total display extent shown in FIG. 3, comprising 29 display columns, will therefore be referred to as a display period. This display period is divided into a number of areas denoted as D1 to D6. Of these, the 6-column areas D1, D2, D4 and D5 contain the tens of hours, units of hours, tens of minutes and units of minutes digits respectively, the two-column area D3 contains the colon, separating hours from minutes, and the three-column area D6 is a space area. The display range 13 comprises 8 columns, i.e. the numeral portions shown in black within display range 13 in FIG. 3 correspond to the contents of time display section 12 in FIG. 1.

For the condition shown in FIG. 1 and FIG. 3, the current time is 23:58 (on the 24-hour system), and the numerals 2 and 3 of this information are visible on time display section 12. The information shown in FIG. 3 can be thought of as being moved across time display section 12 at a constant speed. Thus, shortly after the instant corresponding to FIG. 3, the information will have moved from right to left such that the 3 digit is completely visible, subsequently the colon will appear and the 2 digit disappear, thereafter the digits of the minutes information will appear, and eventually, after a display period has elapsed, the display condition will return to that shown in FIG. 1 and FIG. 3.

When the display has shifted to a position such that the left-hand column of the tens of minutes digit (5, in this example) has reached column X6 shown in FIG. 3, then the minutes portion 17 of identification mark display section 14 will be made visible, i.e. the letter M will appear and the letter H will disappear, thereby indicating that the displayed digits represent minutes information. Similarly, when the right-hand column of the units of minutes aread D5 reaches the X6 column of time display section 12, then the letter M disappears and the letter H appears on identification mark display section 14. In this embodiment, the H or M marks are displayed in a repetitive flashing manner, for greater effectiveness.

The inventor has found that a high degree of display legibility is attained when the display range 12 is made less than the range of a pair of digits, but greater than the range of a single digit. It has been found that if the display range is made approximately equal to or less than the range of a single digit, then the display becomes difficult to read. For this reason, the display range 13 is equal to approximately 1½ digits in this embodiment, this range being close to optimum with regard to both miniaturization of the display and maintaining ease of display legibility.

Figure 4:
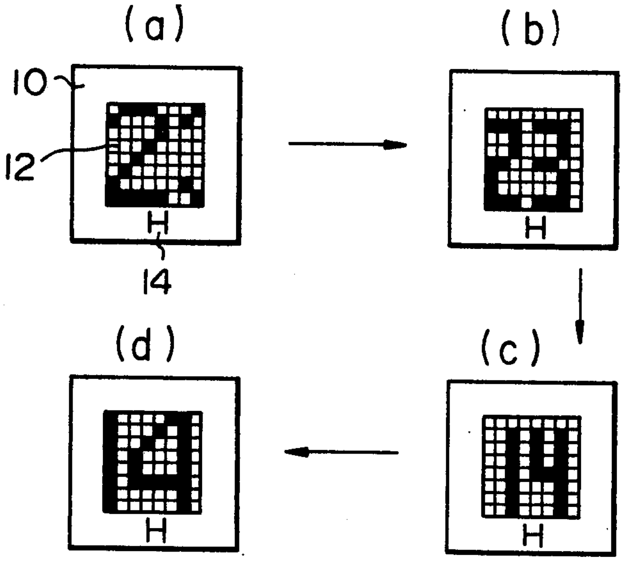
FIGS. 4(a) to (c) are diagrams for illustrating the transitions between the normal time display mode and the time correction mode for the electronic timepiece of FIG. 1.

The correction mode of this embodiment will now be described, with reference to FIGS. 4(*a*) to (*d*). FIG. 4(*a*) shows the display unit 10 in the normal time display mode, in which the information "23 hours" is being shifted across time display section 12. At the instant shown, all of the tens of hours digit 2 is visible, but only about half of the units of hours digit appears, while the letter H is flashing on identification mark display section 14. If correction pushbutton 16 is depressed at the moment illustrated in FIG. 4(*a*), then as shown in FIG. 4(*b*), the time correction mode will be entered. In this mode, the two digits of the information category currently being displayed (in this case the hours digits) are shown, reduced in size so that both digits are displayed, with display shifting being halted so that the digits are made stationary. The flashing display of the letter H on identification mark display section 14 is continued, thereby notifying that the hours information can now be corrected. The correction can then be carried out by actuating pushbutton 18, for example to change the hours information from 23 to 14, as shown in FIG. 4(*c*). If now correction designating pushbutton 16 is once more depressed, then the timepiece will return to the normal time display mode, as indicated in FIG. 4(*d*), in which display shifting takes place once again.

If it is desired to correct the minutes information, then this can be done by actuating pushbutton 16 while the minutes information digits are being shifted across time display section 12, i.e. while the letter M is flashing on identification mark display section 14. The minutes digits will then appear together, reduced in size and stationary, on time display section 12 and can be corrected as described above for the hours digits. Thus, it can be understood that the laterally shifting display function of an electronic timepiece according to the present invention, together with the identification of the category of time information currently being displayed, given by identification mark display section 14, and externally actuatable switch means, together provide a time information correction selection function. The latter function enables correction of time information to be easily and rapidly performed, in spite of the small size of time display section 12.

Figure 5:
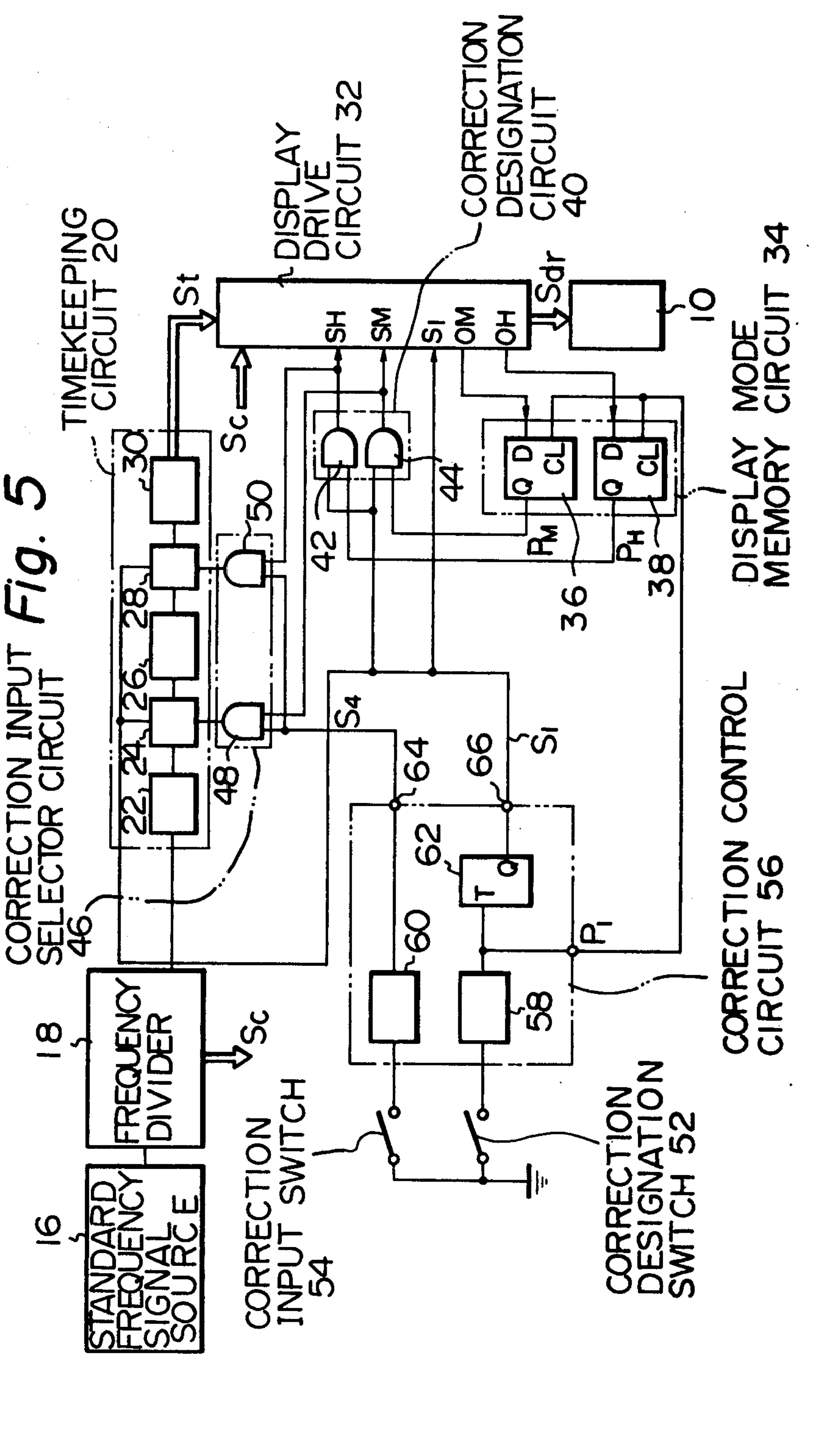
FIG. 5 is a block circuit diagram of a first embodiment of a digital electronic timepiece according to the present invention.

Referring now to FIG. 5, a block diagram is shown of the embodiment of FIG. 1. In FIG. 5, numeral 16 denotes a standard frequency oscillator circuit which generates a standard frequency signal. This signal is frequency divided by a frequency divider circuit 18, which thereby generates a unit time signal Su, and a number of different timing clock signals, collectively designated as Sc. The unit time signal Su is input to a timekeeping circuit 20, and is counted therein to provide time information. The timekeeping circuit 20 comprises a seconds counter circuit 22, a minutes counter circuit 26, and an hours counter circuit 30. Selector gate circuits 24 and 28 are provided between seconds counter 22 and minutes counter 26 and between minutes counter 26 and hours counter 30, respectively, and serve to selectively input time information signals and time correction signals to counter circuits 26 and 30.

Time information signals, representing the hours and minutes of current time, are output by timekeeping circuit 20 and are collectively designated as St in FIG. 5. These time information signals St are input to a display drive circuit 32, together with timing signals Sc from frequency divider circuit 18. In response, display drive circuit 32 generates display drive signals, denoted collectively as Sdr in the figure, which provide a shifting display on display unit 10 in the normal time display mode and a fixed display in the time correction mode, as described hereinabove, together with the appropriate mark on identification mark display section 14. Display drive circuit 32 also produces output signals OM and OH. While the minutes mark "M" is flashing on identification mark display section 14, signal OM remains at a high logic level (referred to hereinafter as the H level) and signal OH at a low logic level (referred to hereinafter as the L level), and while the hours mark "H" is flashing on identification mark display section 14, signal OH remains at the H level and signal OM at the L level. Display drive circuit 32 is coupled to receive display correction selector signals SH and SM. When signal SH is at the H level and SM at the L level, then the hours information correction status is entered (e.g. as shown in FIG. 4(*b*)) and when signal SM is at the H level and SH at the L level, then the minutes information correction status is entered, as described hereinabove.

Numeral 34 denotes a display mode memory circuit, used to store the category of information being displayed at the moment of actuation of correction designation pushbutton 16, i.e. either the hours or minutes category. Circuit 34 comprises two data-type flip-flops (hereinafter abbreviated to D-FF) 36 and 38. The correction designation pushbutton 16 is coupled to a correction designation switch 52, which is connected to a switch bounce suppression circuit 58 within a correction control circuit 56. Thus, each actuation of correction designation pushbutton 16 results in a single pulse signal, designated as P1, being output from circuit 58. Signal P1 is coupled to the clock input terminals CL of D-FFs 36 and 38, while signals OM and OH are connected to the data input terminals of D-FFs 36 and 38 respectively. Thus, if the hours digits are being displayed when correction designation pushbutton 16 is actuated, this condition will be memorized by the output PH of D-FF 38 going to the H level and remaining at that level until correction designation pushbutton 16 is again actuated. Similarly, if the minutes digits are being shifted across time display section 12 at the instant when pushbutton 16 is depressed, then the output signal PM from D-FF 36 will go to the H level, and remain there unitl the next actuation of pushbutton 16.

Correction control circuit 56 further comprises a bounce suppression circuit 60 and a toggle-type flip-flop (abbreviated hereinafter to T-FF) 62, whose toggle input T is coupled to receive signal P1 described above. Thus, an output signal S1 from the Q terminal of T-FF 62 is inverted on successive actuations of correction designation pushbutton 16. A correction input switch 54 is coupled to correction input pushbutton 18, so that a single pulse signal S4 is generated in response to each actuation of pushbutton 18, from switch bounce suppression circuit 60.

Correction designation signal S1 is input to display drive circuit 32, to selector gates 24 and 28 of timekeeping circuit 20, and to a correction designation circuit 40 which comprises a pair of AND gates 42 and 44. It will be apparent from the connections shown that, when correction designation switch 52 is actuated such that a signal pulse P1 sets signal S1 from T-FF 62 to the H level, then correction designation circuit 40 will act to selectively set either signal SH or signal SM to the H level, in accordance with whether signal PH or PM respectively is at the H level at that time. As stated above, when signal SH is at the H level, the timepiece is in the hours information correction status, while when signal SM is at the H level then the timepiece is in the minutes information correction status. In the following, signal S1 will be referred to as a correction mode signal, signal S4 as a correction input signal, signals SH as an hours correction designation signal, and signal SM as a minutes correction designation signal.

Numeral 46 denotes a correction input gate circuit, comprising AND gates 46 and 48. This circuit acts to transfer the correction input signal S4 to timekeeping circuit 20 in accordance with the signals SH and SM from correction designation circuit 40. Thus, when signal SH is at the H level, correction input signal S4 is transferred through AND gate 50 to selector circuit 28 of timekeeping circuit 20. If at this time correction mode signal S1 is at the H level, then signal S4 will be input to hours counter circuit 30, to thereby correct the hours information. Similarly, if signal SM is at the H level together with signal S1, then correction input signal S4 will be transfered through AND gate 48 and then through selector circuit 24 of timekeeping circuit 20, to be thereby input to minutes counter circuit 26 of timekeeping circuit 20, to perform correction of the minutes information.

The operation of the circuit of FIG. 5 can be summarized as follows, assuming for example that the correction designation switch 52 is actuated at an instant when the pattern shown in FIG. 1 appears on time display section 12, with the H letter appearing on identification mark display section 14. As a result of the switch actuation, a pulse of signal P1 will be generated, whereby signal S1 from T-FF 62 will go to the H level. Since hours information is currently being displayed on time display section 12, output OF from display drive circuit 32 will be at the H level, and this condition will be memorized by the P1 pulse causing the output PH of D-FF 38 to be set to the H level, and output PM at the L level. Thus, signal PH, in conjunction with signal S1, will cause hours correction designation signal SH to go to the H level, thereby enabling AND gate 50 in correction input gate circuit 46. In response to the H level of signal SH, display drive circuit 32 will act to process the time information signals St from timekeeping circuit 20 such that display drive signals Sdr applied to display unit 10 cause the display of hours information to be made stationary on time display section 12 and also reduced in size so that two digits representing the hours information are displayed fully and simultaneously, as illustrated in FIG. 4(*b*). In this condition, i.e. the hours information correction mode, successive actuations of correction input switch 54 to produce pulses oaf correction input signals S4 will result in these pulses being transferred through AND gate 50, and through selector circuit 28 of timekeeping circuit 20 (enabled by the H level condition of signal S1) into hours counter circuit 30 of timekeeping circuit 20. The hours of time information can thereby be corrected to a desired value. Upon completion of this correction, a further actuation of correction designation switch 52 will result in a pulse of signal P1 being produced, whereby signal S1 from T-FF 62 returns to the L level, thereby terminating the correction designation mode. Selector circuits 24 and 28 in timekeeping circuit 20 will now transfer timekeeping signals into minutes counter 26 and hours counter 30, and display drive circuit 32 will respond to the L level of signals S1, SH and SM by processing the time information signals St from timekeeping circuit 20 to produce display drive signals Sdr such that a continuously shifting display of time information appears on time display section 12 as described above, i.e. the timepiece returns to the normal time display mode.

If it is desired to correct the minutes information, then the procedure is identical to that described above, except for the fact that correction designation switch 52 must be actuated while minutes information are being shifted across time display section 12 so that the M mark is flashing on identification mark display section 14. In this case, since signal OM will be at the H level when correction mode signal S1 goes to the H level, signal PM will be locked at the H level, so that minutes correction designation signal SM will go to the H level. Pulses of correction signal S4 resulting from actuation of switch 54 will then be transferred through AND gate 48 and selector circuit 24 into minutes counter circuit 24 of timekeeping circuit 20. At this time, the minutes information will be displayed, as two complete and stationary digits, on time display section 12 of display unit 10, with the M mark flashing on identification mark display section 14. Return to the normal time display mode can be performed, when minutes correction is completed, by again actuating correction designation switch 52, to set signal S1 to the L level.

Figure 6A:
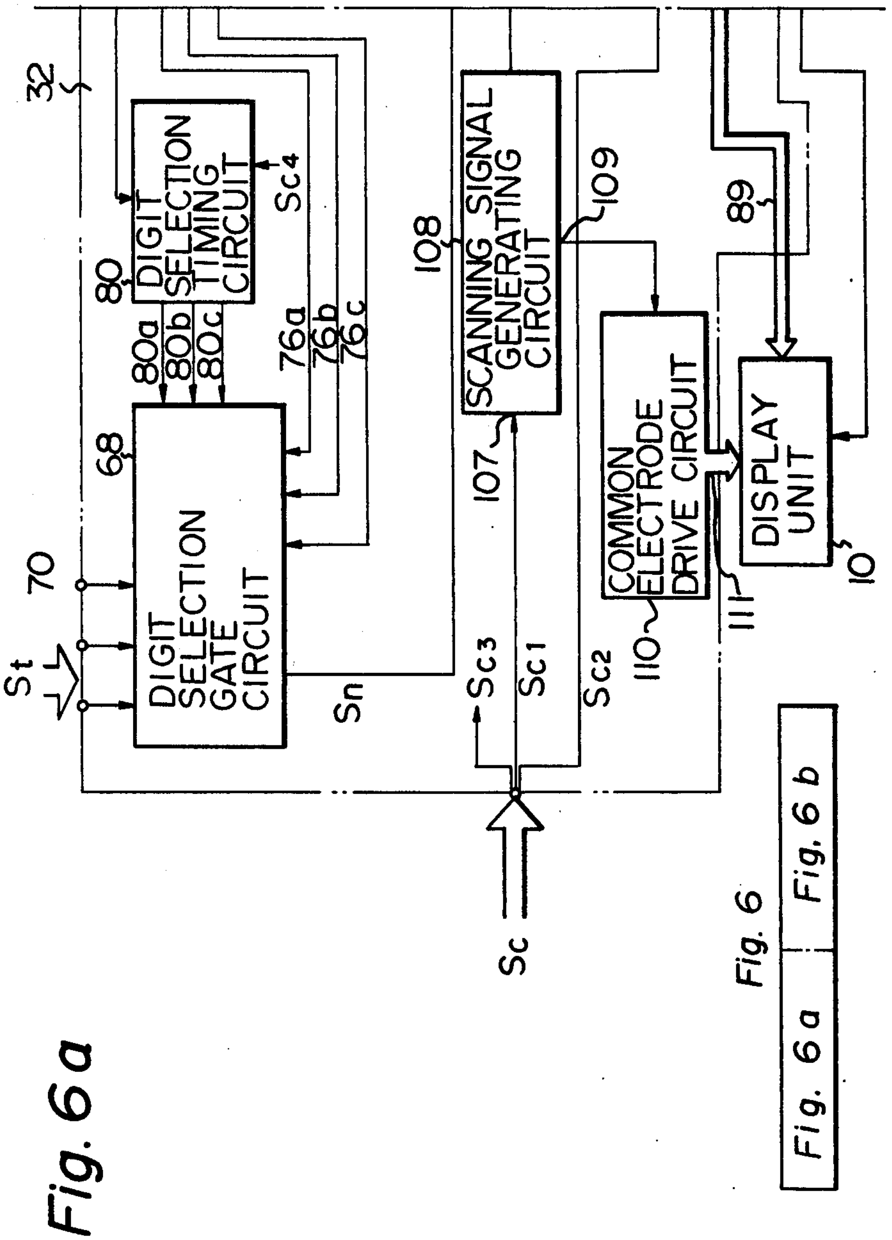
FIGS. 6A–6B are block circuit diagrams of a display drive circuit used in the embodiment of FIG. 5.
Figure 6B:
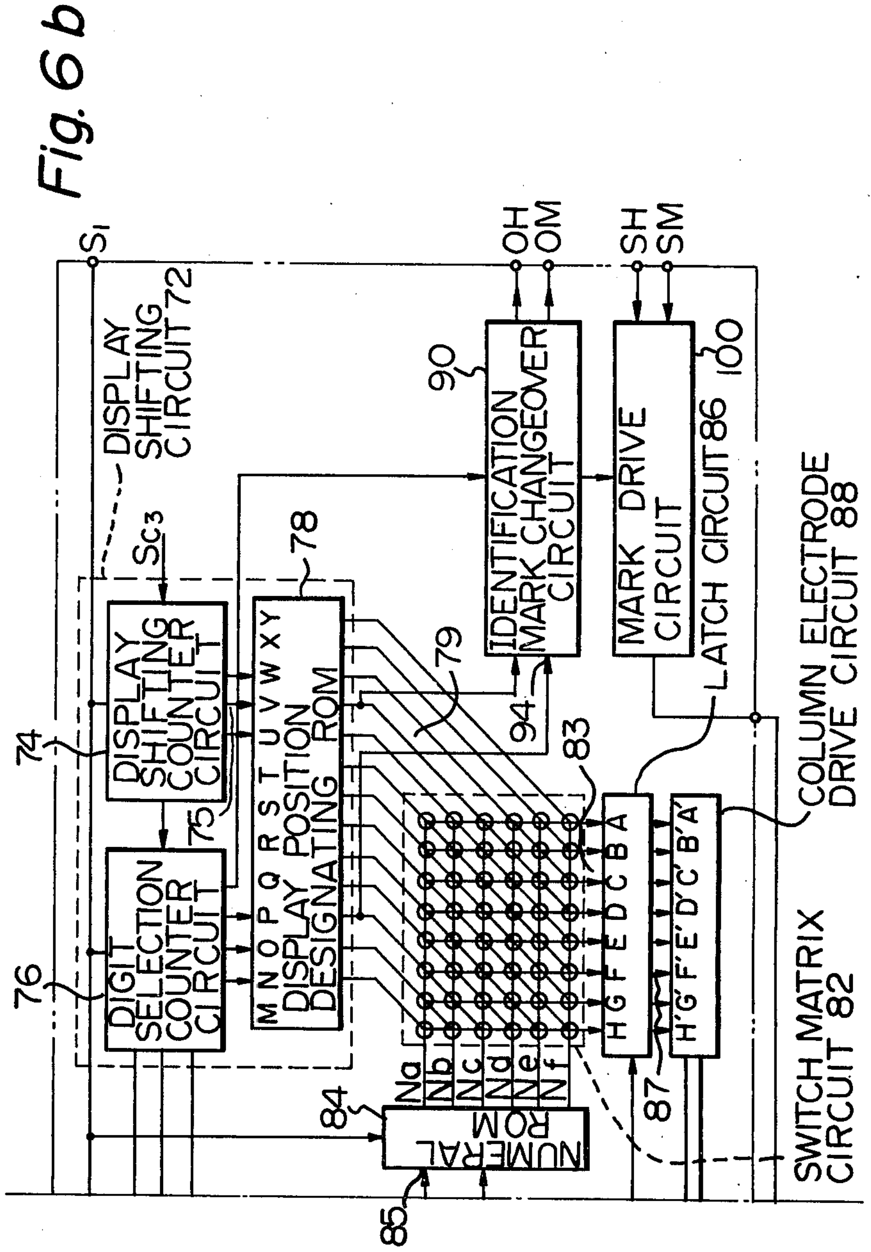

A block circuit diagram of the display drive circuit 32 of FIG. 5 is shown in FIG. 6. Numeral 68 denotes a digit selection gate circuit. This circuit acts to select, from the time information signals St output by timekeeping circuit 20, signals representing digits which are to be currently displayed on time display section 12, and operates under the control of output signals from a digit selection timing circuit 80 and from a display shifting circuit 72. Digit selection timing circuit 80 receives correction mode signal S1 and timing clock signal Sc4, while display shifting circuit 72 receives correction mode signal S1 and timing clock signal Sc3. The timing clock signals Sc3 and Sc4 are part of a group of timing signals Sc which are applied to display drive circuit 32 from frequency divider circuit 18. The display shifting circuit 72 comprises a digit selection counter circuit 76 and a display shifting counter circuit 74, together with a display position designating ROM 78 (where "ROM" denotes "read-only memory circuit). Display shifting counter circuit 74 counts pulses of timing signal Sc3 under the control of correction mode signal S1, while digit selection counter 76 counts output signal pulses from display shifting counter circuit 74, to thereby produce a set of output signals 76*a*, 76*b* and 76*c*. Digit selection timing circuit 80 responds to clock signal Sc4 by producing output signals 80*a*, 80*b* and 80*c*.

Display position designating ROM 78 is provided with 13 output lines, and the signals generated on these output lines are designated respectively by the letters M to Y in FIG. 6. Signals M to Y are normally at the L level, and are selectively set to the H level, in a periodically shifting manner described hereinafter, under the control of output signals from digit selection counter 76, with the speed of shifting being controlled by output signals from display shifting counter circuit 74.

A numeral ROM 84 has stored therein a plurality of patterns, corresponding to the shapes of the large numerals and the colon symbol which are displayed on time display section 12 in the normal time display mode, and the small numerals which are displayed in the time correction mode. These patterns are called out from numeral ROM 84 as designated by numeral designating signals Sn from digit selection gate circuit 68, under the control of scanning signals from a scanning signal generating circuit 108, and correction mode signal S1, as described hereinafter. Signals representing these numeral patterns called out from numeral ROM 84 appear on a set of six output lines thereof, and are designated as signals Na to Nf in FIG. 6.

Signals Na to Nf from numeral ROM 84 are input to a switch matrix circuit 82, which constitutes the display range limiting means of this embodiment. Signals designated as A to H are produced on a set of eight output lines 83 from switch matrix circuit 82, with each of output lines 83 being connected to the input of a corresponding memory latch within a latch circuit 86. Corresponding output signals, designated as A' to H' are output from latch circuit 86, and input to a column electrode drive circuit 88 over a set of output lines 87. Column electrode drive circuit 88 thereby produces column electrode drive signals, indicated by numeral 89, which are applied to the column electrodes of display unit 10 (i.e. to ime display section 12). Row electrode scanning signals are produced from scanning signal generating circuit 108, and applied to a common electrode drive circuit 110 over output lines denoted by numeral 109. In response, commom electrode drive circuit 110 produces common electrode drive signals which are applied to the common electrodes (i.e. the row electrodes corresponding to display element rows Y1 to Y8 of time display section 12 shown in FIG. 2).

Numeral 90 denotes an identification mark changeover circuit, which sets signal OH to the H level when a display of hours digits on time display section 12 begins and sets signal OM to the H level when a display of minutes digits begins, in the normal time display mode, as described hereinabove. Circuit 90 is controlled by an output signal applied over line 77 from digit selection counter 76, and by signals O and V from display position designating ROM 78, as described hereinafter. An output signal from identification mark changeover circuit, designating whether an M or an H mark is to be displayed on identification mark display section 14 in the normal time display mode, is applied to a mark drive circuit 100, which responds by applying a drive signal over line 104 to display unit 10, causing the appropriate identification mark to flash on and off on identification mark display section 14. In the time correction mode, either signal SH or SM is held at the H level, as described above, and these signals are applied to mark drive circuit 100 to hold the identification mark corresponding to the current correction mode (i.e. either minutes or hours) on identification mark display section 14.

Figure 7:
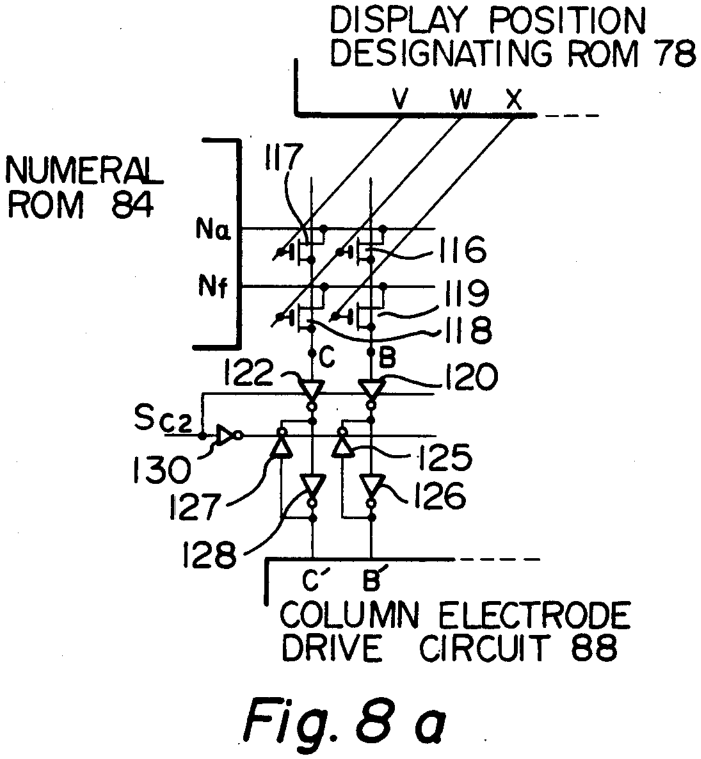
FIG. 7 is a partial circuit diagram of a switch matrix and latch circuit used in the circuit of FIG. 6.

The configuration of switch matrix circuit 82 will now be described, with reference to the partial circuit diagram of FIG. 7 and the waveform diagram of FIG. 8(*a*). As shown in FIG. 7, switch matrix circuit 82 comprises an array of switching transistors, four of which are denoted by numerals 116 to 119. The gate electrodes of switching transistors which are arrayed along a common diagonal of switch matrix circuit 82 are connected in common to one of the signals lines 79 from display position designating ROM 78, i.e. each of the 13 diagonal lines is coupled to receive a corresponding one of the output signals M to Y from display position designating ROM 78, as can be seen in FIG. 6. Thus, the gate electrodes of transistors 116 and 118 are connected in common to receive signal W from display position designating ROM 78, for example. Each of the output signals Na to Nf from numeral ROM 84 is connected to a corresponding line coupled to the gate electrodes of a row of switching transistor input electrodes. Thus, for example in FIG. 7, the output signal Ne from numeral ROM 84 is coupled in common to the input electrodes of transistors 116 and 117. The columns of switch matrix circuit 82, i.e. the set of lines 83 upon which output signals A to H from switch matrix circuit 82 appear, comprise lines each of which is connected in common to the output electrodes of a column of switching transistors of switch matrix circuit 82. Thus for example, signal B from switch matrix circuit 82 is output on a line which connects the output electrodes of switching transistors 116 and 119.

Latch circuit 86 comprises 8 stages, each consisting of an inverter, e.g. inverter 120, which is coupled to the input of a latch loop comprising a pair of inverters, for example 125 and 126, connected in a closed loop. Output signals from these latch loops, e.g. signal B', are input to corresponding stages of column electrode drive circuit 88. The operation of latch circuit 86 is controlled by timing signal Sc2. For example, while signal Sc2 is at the L level, all of the inverters 120, 122, etc, are held inoperative, while the latch loops comprising transistor pairs 125 and 126, 127 and 128, etc, are operative to store some logic level. When signal Sc2 goes to the H level, then inverters 120, 122, etc are made operative, while the latch loops are open-circuited. When signal Sc2 subsequently returns to the L level, the logic level appearing at the input of each inverter 120, 122, etc, at that instant is memorized by the corresponding latch loop, and appears at the output thereof as one of the signals A' to H' to be input to column electrode drive circuit 88. Output signals corresponding to the logic levels of signals A' to H' from latch circuit 86 are thereby output by column electrode drive circuit 88, over output lines 89 in FIG. 7. Thus, for example, while signal A' from latch circuit 86 is at the H level, a corresponding drive signal will be applied to the column electrode of the display element column X1 shown in FIG. 2, so that when a common electrode drive signal is applied to a common electrode of that column of display elements, for example to the common electrode of display element row Y1, then the display element X1,Y1 will be made visible. In a similar way, the column electrodes of display element columns X2 to X8 are driven by drive signals controlled by signals B' to H' respectively, from latch circuit 86. The common electrode drive signals COM1 to COM8 are generated successively and cyclically by scanning signal generating circuit 108, and applied to the common (i.e. row) electrodes of display element rows Y1 to Y8 respectively, shown in FIG. 2.

During each of signal pulses 80*a*, 80*b* and 80*c* from digit selection timing circuit 80, signals Sn representing either a digit of time information, the colon symbol, or a space, i.e. signals representing one of the display portions D1 to D6 shown in FIG. 3, are output by digit selection gate circuit 68. The information represented by the latter signals Sn is determined by the current count state of digit selection counter 76, as is shown in Table 1 below.

TABLE 1

| Circuit 76 | Signal Sn contents | | |
|---|---|---|---|
| count state | Signal 80a | Signal 80b | Signal 80c |
| 0 0 0 | Tens of hours | Units of hours | Colon |
| 0 0 1 | Units of hours | Colon | Tens of minutes |
| 0 1 0 | Colon | Tens of minutes | Units of minutes |
| 0 1 1 | Tens of minutes | Units of minutes | Space |
| 1 0 0 | Units of minutes | Space | Tens of hours |
| 1 0 1 | Space | Tens of hours | Units of hours |

In Table 1, the column under each of "Signal 80*a*" "Signal 80*b*" and "signal 80*c*" represents the contents of signal Sn during the H level state of signal 80*a*, 80*b* or 80*c*, during a corresponding count state of digit selection counter circuit 76. Thus, while counter circuit 76 is at the 000 count state, the contents of signal Sn from digit selection gate circuit 68 represent the tens of hours digit of the current time, e.g. the numeral 1 if the current time is 12:15, for example, while signal 80*a* is at the H level. During the immediately succeeding H level pulse of signal 80*b*, the contents of signal Sn will represent the units of hours digit (i.e. the numeral 2 in the latter example), and during the next H level of signal 80*c*, signals Sn will represent the colon symbol.

Numeral ROM 84 responds to the signals Sn from digit selection gate circuit 68 by outputting signals representing a stored pattern corresponding to the digit, colon or space designated by signals Sn. The stored pattern is output one row at a time, as signals Na to Nf from numeral ROM 84. Thus for example, if it is assumed that the signals Sn from digit selection gate circuit 86 currently represent the tens of hours digit 2, the units of hours digit 3 and the colon, respectively, during three successive pulses of signals 80*a*, 80*b* and 80*c*, as for the case of the display example shown in FIG. 1 and FIG. 3, then during the first common electrode scanning pulse COM1 shown in FIG. 8(*a*), signals Na to Nf from numeral 84 would represent the first row Y1 of the digit 2, as shown in portion D1 of FIG. 3, during signal pulse 80*a*, while during the signal pulse 80*b*, signals Na to Nf would represent the first row Y1 of minutes digit 3, shown in portion D2 of FIG. 3, and during the next signal pulse 80*c*, signals Na to Nf would represent the first row Y1 of the colon, i.e. region D3 in FIG. 3. During the next scan pulse COM2, signals Na to Nf would represent the second row Y2 of tens of hours digit 2 during signal pulse 80*a*, would represent the second row of units of hours digit 3 during signal pulse 80*b*, and would represent the second row of the colon during signal pulse 80*c*. In this way, during a set of 8 successive row electrode scan pulses COM1 to COM8, referred to hereinafter as a scan interval, the patterns of three different information units such as two digits and a colon, are output as signals Na to Nf from numeral ROM 84 in the manner described above. These signals Na to Nf from numeral ROM 84 thus define the range (i.e. number of display element columns) of each of the regions D1 to D6 shown in FIG. 3 which accommodate the various information units (an information unit being defined herein as a numeral, character, symbol or display space).

The manner in which signals Na to Nf from numeral ROM 84 are handled by switch matrix circuit 82 will now be described. Referring first to FIG. 7 and FIG. 8(*a*), it will be assumed for the purpose of illustration that during signal pulse 80*a* of scan signal COM1 in FIG. 8(*a*), signals Ne and Nf from numeral ROM 84 to go the H and L levels respectively, and that signal W from display position designating ROM 78 goes to the H level momentarily during signal pulse 80*a*. Since signal W is applied to the gate electrodes of transistors 116 and 118 in switch matrix circuit 82, these transistors will transfer signals Ne and Nf to the inputs of inverters 120 and 122 of latch circuit 86, to appear as signals B and C respectively. Thus, the inputs of inverters 120 and 122 will go to the H and L levels respectively. When signal W returns to the L level, transistors 116 and 118 will return to a non-conducting state, and, due to the input capacitance of inverters 120 and 122, the inputs thereof will remain held at the H and L levels respectively for a certain period of time. Thus, when the next pulse of timing signal Sc2 occurs (at the start of scanning pulse COM2), then inverters 122 and 120 will be activated, and the output signals therefrom will be read into latch loops 125/126 and 127/128 respectively. Thus, output signals B′ and C′ from latch circuit 86 will be held at the H and L levels respectively during scanning pulse COM2. Corresponding drive signals will thereby be output by column electrode drive circuit 88, so that the display pattern portion represented by signals Ne and Nf from numeral ROM 84 will appear on time display section 12 during the time of scanning pulse COM2.

From the above, it can be understood that the information from numeral ROM 84 which is output during the three signal pulses 80*a*, 80*b* and 80*c* during a particular scanning pulse is momentarily memorized during that scanning pulse, by the input capacitances of inverters 120, 122, etc, and then appears as output signals A′ to H′ from latch circuit 86 during the next scanning pulse.

Figure 8A:
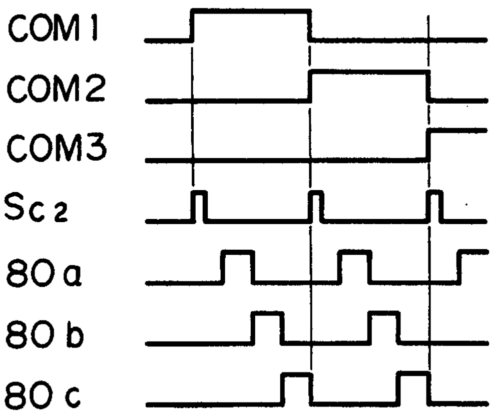
FIGS. 8(a) and 8(b) are waveform diagrams for assistance in describing the operation of the circuit of FIG. 6.
Figure 8B:
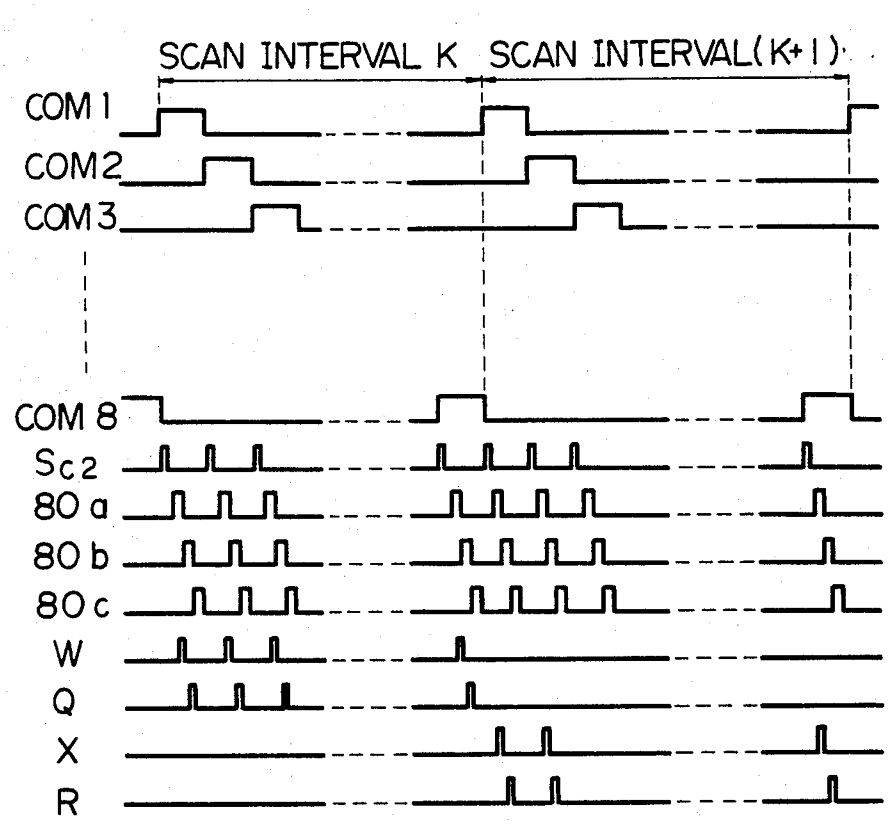

Referring now to FIG. 6 and to the waveform diagram of FIG. 8(*b*), the operation whereby output signals from display position designating ROM 78 control switch matrix circuit 82 such as to produce column drive signals from column electrode drive circuit 88 which produce display information shifting, and whereby switch matrix circuit 82 functions as means for limiting the display range on time display section 12 to that shown in FIG. 3, i.e. 8 display columns, will now be described. For the purposes of explanation, it will be assumed that the display condition is such that the count in digit selection counter 76 is 000, so that as shown in Table 1, the output information from numeral ROM 84 during the signal pulses 80*a*, 80*b* and 80*c* respectively will represent the patterns of the tens of hours digit, the units of hours digit and the colon, respectively. In addition, it will be assumed that the tens and units of hours digits are 2 and 3, respectively, and are about to appear as shown in FIG. 1 and FIG. 3, 3, with 3 columns of the digit 2 pattern and 5 columns of the digit 3 pattern being displayed. Thus, during signal pulses 80*a* and 80*b* of scanning pulse COM1 in scan interval K in FIG. 8(*b*), the signal Na to Nf from numeral ROM 84 will represent the top row Y1 of the 2 digit pattern during pulse 80*a*, and the top row Y1 of the 3 digit pattern during pulse 80*b*, while the top row of the colon pattern will be represented during pulse 80*c*. In scan interval K, signals W and Q go to the H level during each of pulses 80*a* and 80*b* respectively. As a result, the states of signals Nd, Ne and Nf from numeral ROM 84 will be transferred to inputs of latch circuit 86 during pulse 80*a*, while the states of signals Na to Ne will be transferred by switch matrix circuit 82 to inputs of latch circuit 86 during the timing of pulse 80*b*, and these signal states will be momentarily memorized at the inputs to latch circuit 86 by input capacitance effects, as described previously. At the start of the next scanning pulse COM2, timing signal Sc2 goes to the H level briefly, thereby latching the signal states appearing at the inputs to latch circuit 86 into that circuit. Thus, during scan pulse COM2, output signals A', B' and C' will represent the top row Y1 (in FIG. 3) of the digit pattern 2, while outputs D' to H' will represent the top row of the digit pattern 3. Corresponding drive signals will thereby be produced by column electrode drive circuit 88 and applied to the column electrodes of time display section 12, simultaneously with a common electrode drive signal being applied to row Y1 of time display section 12. In this way, the pattern shown in FIG. 3 for the topmost row Y1 of the display will appear. In a similar way, the display elements of the second row Y2 of time display section 12 will be driven during the scanning pulse COM3, the third row Y3 will appear during scanning pulse COM4, and so on, with the last row Y8 appearing during scanning pulse COM1 of the next scan interval (K+1). In this way, the pattern shown in FIG. 3 within display range 13 is built up during scan interval K, partially representing the numerals 2 and 3 as shown.

During the next scan interval (K+1), the signals Q and W from display position designating ROM 78 will be held at the L level, while output signals X and R will go to the H level as shown, during each of the pulses 80*a* and 80*b* respectively from digit selection timing circuit 80. As a result, the numerals 2 and 3 will be shifted from right to left by one column on display section 12. In other words, only two columns of the digit pattern 2, as represented by signals Ne and Nf from numeral ROM 84, will be transferred to latch circuit 86 by output signal X, while all six output signals Na to Nf representing the digit 3 pattern will be transferred to latch circuit 86 by switch matrix circuit 82 in response to signal R from display position designating ROM 78. In the next scan interval, signals Y and S will go to the H level during digit selection pulses 80*a* and 80*b* respectively, so that only output signal Nf from numeral ROM 84 will be transferred to latch circuit 86 during pulse 80*a*. As a result, only the rightmost column of the digit 2 pattern will appear on display section 10. At the start of the following scan interval, when the digit 2 pattern would disappear from the display, an output signal from display shifting counter circuit 74 is input to digit selection counter circuit 76, causing the count therein to be advanced to 001. As a result, the sequence in which information signals Sn are output from digit selection gate circuit 68 is changed, as shown in Table 1, to "Units of hours, colon, tens of minutes" during digit selection pulses 80*a*, 80*b* and 80*c* respectively.

The above process will then be repeated, so that the units of hours digit, the colon, and the tens of minutes digit are shifted across time display section 10. As the units of hours digit passes out of the display area, the count in digit selection counter 76 will again be advanced, to 010, so that the sequence in which pattern signals are output from numeral ROM 84 will again change, as indicated in Table 1. In this way, the digits, colon and space shown in FIG. 3 are successively and cyclically shifted across the display, at a speed determined by signals from display shifting counter circuit applied to display position designating ROM 78, with a specific pair of output signals from ROM 78 being selected at each instant in accordance with the contents of digit selection counter 76, and with the sequence in which signals representing display pattern portions are output from digit selection gate circuit 68 and hence from hence from numeral ROM 84 being determined by the count state of digit selection counter circuit 76.

It will be apparent that the display range 13 shown in FIG. 3 is determined by the switch matrix circuit 82, or rather by the number of diagonals in that circuit. When an output signal from display position designating ROM 78 designates a diagonal of switch matrix circuit 82 having 8 switches therein, then the corresponding output signals from numeral ROM 84 will be transferred completely to column electrode drive circuit 88, so that the pattern represented thereby will be completely displayed. On the other hand, if an output signal from display position designating ROM 78 designates a diagonal of switch matrix circuit 82 which contains less than 6 switches therein, then the corresponding output signals from numeral ROM 84 will be transferred only partially to column electrode drive circuit 88, so that the corresponding display pattern will appear only partially. on time display section 12, on the right or left hand sides thereof.

The operation of identification mark changeover circuit 90 in FIG. 6 will now be described. This circuit receives as inputs a signal 80*d* from digit selection timing circuit 80, and signals O and V from display position designating ROM 78. Signal 80*d* goes to the H level so long as units or tens of minutes digit information is being output from digit selection gate circuit 68. In this condition, signal 0 from display position designating ROM 78 goes to the H level (as shown in FIG. 8(*b*)) when the tens of minutes digit is partially visible on time display section 12 as it moves across the display, and identification mark changeover circuit 90 responds to the H levels of signals 0 and 76*d* by setting output signal OM to the H level and applying an input signal to mark drive circuit 100 causing a signal from this circuit to produce flashing of the letter M on identification mark display section 14. Thereafter, the tens of minutes digit and then the units of minutes digit will become successively completely displayed on time display section 12, and will be shifted from left to right. Subsequently, as the units of minutes digit is beginning to shift off the display, signal V from display position designating ROM 78 will go to the H level while the units of minutes digit information signals are being output from digit selection gate circuit 68, so that signal 76*d* is at the H level. In response, identification mark changeover circuit 90 sets output signal OM to the L level, and sets signal OH to the H level, and applies a signal to mark drive circuit 100 causing the latter to generate a drive signal which produces flashing of the letter H on identification mark display section 14. In this way, the letter M appears on identification mark display section 14 as the minutes digits begin to be shifted across time display section 12, and the letter H as the hours digits begin to be shifted across.

The operation in the time correction mode will now be described. As explained hereinabove, when correction designation switch 52 shown in FIG. 5 is actuated, then correction mode signal S1 from correction control circuit 7 goes to the H level, and either signal SH or SM from correction designation circuit 40 goes to the H level, and is input to mark drive circuit 100 of display drive circuit 32. As a result, signal S1 acts to halt counting by display shifting counter circuit 74, and to set digit selection counter such that signals T and P from display position designating ROM 78 are fixedly held at the H level. As a result, a fixed display condition is established. If the letter H is being displayed as the identification mark when switch 52 is actuated, then digit selection counter 76 is fixedly set to a count of 000, while if the letter M is being displayed at that instant, then the count in counter 76 is set to 011. In addition, The H level state of correction mode signal S1 causes numeral ROM 84 to produce output signals Na to Nf representing different, smaller shapes of the digits to be displayed in the correction mode. Instead of each digit occupying a display region of 6 columns, as shown in FIG. 3, each digit now occupies only 4 display columns, so that both of the hours digits or minutes digits are fixedly displayed simultaneously. The contents of each of these sets of 4 columns are output from numeral ROM 84 as signals Na, Nb, Nc and Nd. The way in which the digit patterns are represented by the output signals Na to Nf from numeral ROM 84, in the case of operation in the normal time display mode and in the time correction mode, respectively, will be made more apparent by Table 2 and Table 3 below. In these tables, it is assumed for the purpose of illustration that the digits 23 are being displayed in each case.

TABLE 2

| Scanning | Digit 2 pattern | | | | | | Digit 3 pattern | | | | | |
|---|---|---|---|---|---|---|---|---|---|---|---|---|
| signal | Na | Nb | Nc | Nd | Ne | Nf | Na | Nb | Nc | Nd | Ne | Nf |
| COM1 | 0 | 0 | 1 | 1 | 1 | 0 | 0 | 0 | 1 | 1 | 1 | 0 |
| COM2 | 0 | 1 | 0 | 0 | 0 | 1 | 0 | 1 | 0 | 0 | 0 | 1 |
| COM3 | 0 | 0 | 0 | 0 | 0 | 1 | 0 | 0 | 0 | 0 | 0 | 1 |
| COM4 | 0 | 0 | 0 | 0 | 1 | 0 | 0 | 0 | 0 | 1 | 1 | 0 |
| COM5 | 0 | 0 | 0 | 1 | 0 | 0 | 0 | 0 | 0 | 0 | 0 | 1 |
| COM6 | 0 | 0 | 1 | 0 | 0 | 0 | 0 | 0 | 0 | 0 | 0 | 1 |
| COM7 | 0 | 1 | 0 | 0 | 0 | 0 | 0 | 1 | 0 | 0 | 0 | 1 |
| COM8 | 0 | 1 | 1 | 1 | 1 | 1 | 0 | 0 | 1 | 1 | 1 | 0 |

TABLE 3

| Scanning | Digit 2 pattern | | | | Digit 3 pattern | | | |
|---|---|---|---|---|---|---|---|---|
| signal | Na | Nb | Nc | Nd | Na | Nb | Nc | Nd |
| COM1 | 0 | 0 | 0 | 0 | 0 | 0 | 0 | 0 |
| COM2 | 0 | 0 | 0 | 0 | 0 | 0 | 0 | 0 |
| COM3 | 0 | 0 | 0 | 0 | 0 | 0 | 0 | 0 |
| COM4 | 1 | 1 | 1 | 0 | 1 | 1 | 1 | 0 |
| COM5 | 0 | 0 | 1 | 0 | 0 | 0 | 1 | 0 |
| COM6 | 0 | 1 | 1 | 0 | 0 | 1 | 0 | 0 |
| COM7 | 1 | 0 | 0 | 0 | 0 | 0 | 1 | 0 |
| COM8 | 1 | 1 | 1 | 0 | 1 | 1 | 1 | 0 |

From the above it can be seen, for example, that in the normal time display mode, with a count of 000 in digit swelection counter 76, signals Na, Nb, Nc, Nd and Nf from numeral ROM 84 will go to the H level (represented by 0 in Tables 1, 2 and 3 above), while signal Ne will go to the H level (represented by 1 in Tables 1 to 3 above), during scanning pulse COM4, while digit selection pulse **80*a* is at the H level. In this case, these output signals from numeral ROM 84 represent the fourth row Y4 of the digit 2 pattern, for the hours digit 2. In the time correction mode, however, as shown in Table 2, signals Na, Nb and Nc will go to the H level, and signal Nd to the L level, during scanning signal COM4, while digit selection pulse 80*a*** is at the H level, and in this case, signals Na to Nd represent the topmost row of the numeral 2, reduced in size for time correction display purposes. In a similar way, any other digit can be displayed in reduced size, using 4 display columns, when the time correction mode is entered.

In this mode, actuation of correction input switch 54 will produce correction signal pulses S4, which will change the contents of the minutes counter 26 or hours counter 30, as described hereinabove, with the results of this correction being visible on the display in the form of the two reduced-size digits.

Figure 9:
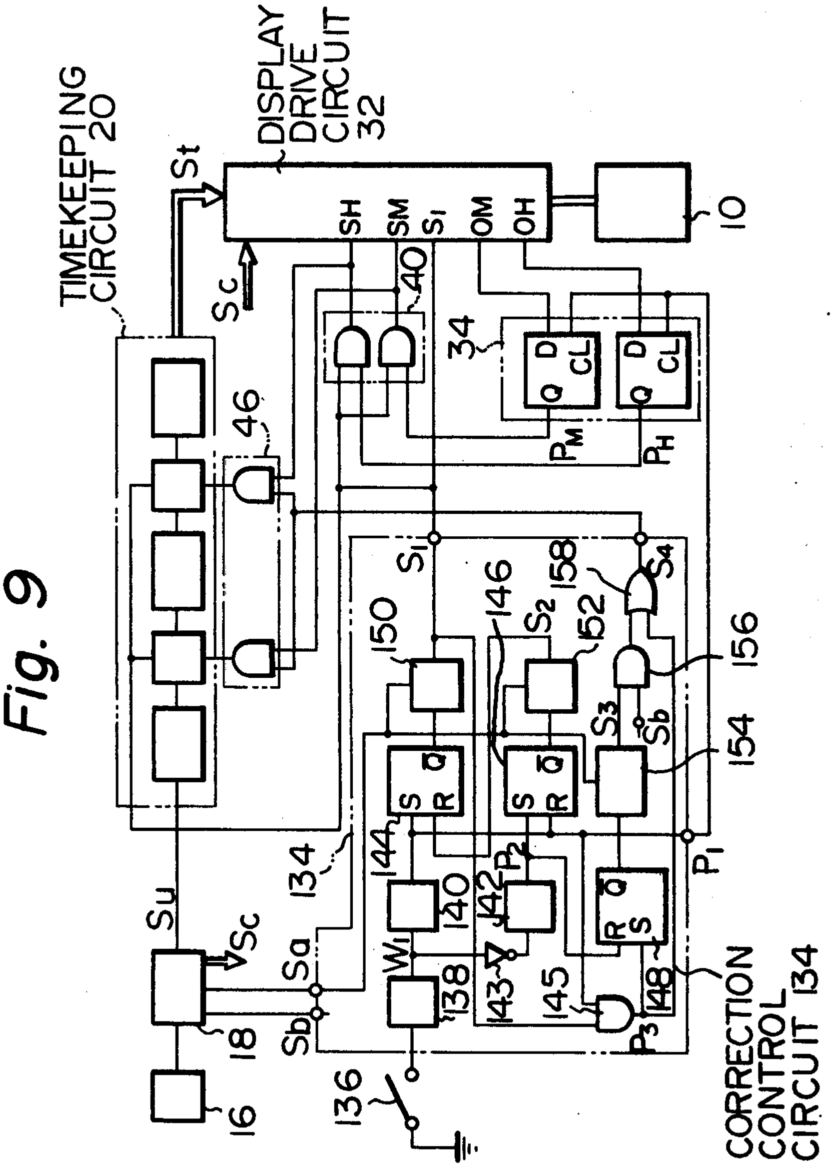
FIG. 9 is a block circuit diagram of a second embodiment of a digital electronic timepiece according to the present invention.

Referring now to FIG. 9, a second embodiment of a digital electronic timepiece according to the present invention will now be described. Circuit blocks in FIG. 9 which are identical to those of the embodiment of FIG. 5 are designated by identical reference numerals, and will not be described further. The basic difference between this embodiment and that of FIG. 5 lies in the correction control means. In the embodiment of FIG. 5, two switches, i.e. correction designation switch 52 and correction input switch 54 are used, in conjunction with correction control circuit 56. However in the embodiment of FIG. 5, a single correction switch 136 is used, in conjunction with a correction control circuit 134, with correction switch 136 performing in common the functions of switches 52 and 54 in the embodiment of FIG. 5.

The configuration of correction control circuit 134 will now be described. Numeral 138 denotes a switch bounce suppression circuit, whose output signal W1 goes cleanly from the L to the H level when correction switch 136 is set from the OFF (e.g. open) state to the ON (e.g. closed) state, and goes from the H to the L level when correction switch 136 is set from the ON to the OFF state. Signal W1 is input to an ON differentiator circuit 140 and to an inverter 143. The ON differentiator circuit 140 produces a single ON pulse signal P1 each time correction switch 136 is set from the OFF to the ON state. The output of inverter 143 is applied to the input of an OFF differentiator circuit 142 which produces an OFF pulse signal P2 each time correction switch 136 is set from the ON state to the OFF state. Numerals 144, 146 and 148 denote three set-reset flip-flops, abbreviated hereinafter to RS-FF. RS-FF 144 has a set input terminal coupled to receive ON pulse signal P1 from ON differentiator circuit 140. RS-FF 146 is coupled to be reset by the ON pulse signal P1. RS-FF 148 is reset in response to OFF pulse signal P2 from OFF differentiator circuit 142. Numerals 150, 152 and 154 denote timer circuits having control input terminals coupled to the Q outputs of RS-FFs 144, 146 and 148 respectively, each of which is coupled to receive a clock signal Sa from frequency divider circuit 18. Timer circuit 150 produces a correction mode signal S1, as described hereinafter, and signal S1 of this embodiment has identical functions to correction mode signal S1 of the embodiment of FIG. 5, i.e. to set various circuit portions and elements into the time correction mode. The timer circuit 152 produces a correction mode cancelling signal S2 as described hereinafter, which serves to terminate generation of correction mode signal S1 and to return correction control circuit 134 to a waiting status. the timer circuit produces a rapid correction timin signal S3, which serves to control the duration of transfer of pulses of clock signal Sb through an AND gate 156. correction mode signal S1 and ON pulse signal P1 are input to an AND gate 145, whose output is applied to the set terminal S of RS-FF 148, and to an input of an OR gate 158. The output of AND gate 156 is apaplied to the other input of OR gate 158. OR gate 158 produces correction input signal S4, whose function is identical to that of correction input signal S4 of the embodiment of FIG. 5.

Figure 10:
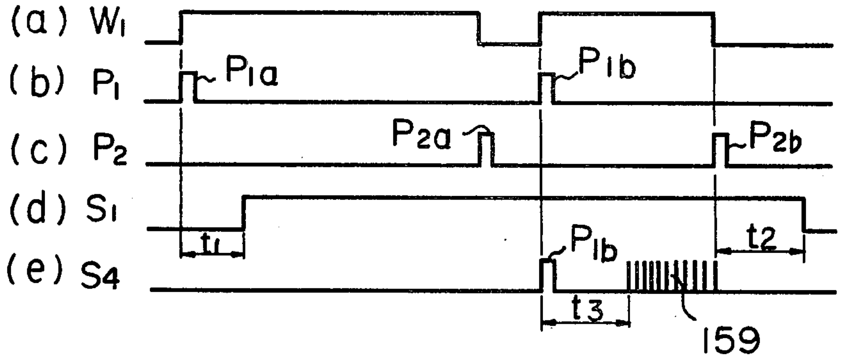
FIG. 10 is a waveform diagram for illustrating the operation of the embodiment of FIG. 9.

The operation of correction control circuit 134 will now be described, with reference to the waveform diagram of FIG. 10. The manner in which ON pulse signal P1 and OFF pulse signal P2 are produced will first be described. If correction switch 136 is set from the OFF to the ON state, then signal W1 will go from the L to the H level, as shown in FIG. 10(*a*), while signal W1 returns to the L level when correction switch 136 is set from the ON to the OFF state. When signal W1 goes to the H level, a pulse of signal P1 is produced, as indicated by pulses P1*a* and P1*b* in FIG. 10(*b*). Conversely, each time correction switch 136 is set from the ON to the OFF state, so that signal W1 returns to the L level, then a pulse of signal P2 is generated, as exemplified by pulses P2*a* and P2*b* in FIG. 10(*c*). The manner in which correction mode signal S1 is set to the H level when correction switch 136 is set ON, and is reset to the L level by correction mode cancelling signal S2 when correction switch 136 is set in the OFF state, will now be described. First, when correction switch 136 is set from OFF to ON, an ON pulse P1 is output from ON differentiator circuit 140 and is applied to the set input of RS-FF 144, thereby setting RS-FF 144. As a result, output $\overline{Q}$ of RS-FF 144 goes from the H to the L level. At the same time, ON pulse P1 resets the RS-FF 146. Wnen output Q from RS-FF 144 goes to the L level, timer circuit 150 is released from a reset condition, and begins to count the pulses of clock signal Sa. Thus, after a predetermined time interval t1, correction mode signal S1 goes from the L to the H level, as shown in FIG. 10(*d*), i.e. after a predetermined number of pulses have been counter by timer circuit 150. Subsequently, when correction switch 136 is set from the ON to the OFF state, an OFF pulse P2 will be generated as described above, and this pulse will set RS-FF 146. As a result, output $\overline{Q}$ from RS-FF146 goes from the H to the L level, whereby timer circuit 152 begins to count pulses of clock signal Sa. If it is assumed that correction switch 136 is held in the OFF state thereafter, then correction mode cancelling signal S2 will go from the L to the H level after a predetermined time interval t2 determined by timer circuit 152, thereby resetting RS-FF 144 and so causing output $\overline{Q}$ of RS-FF 144 to return from the L to the H level. As a result, timer circuit 150 will be immediately reset, causing correction mode signal S1 to be cancelled, i.e. to return to the L level. Thus, as described above, when correction switch 136 is first set ON, then correction mode signal S1 goes to the H level after a predetermined interval determined by timer circuit 150, whereupon the correction mode is entered. If correction switch 136 is then set OFF, and held in this state, then correction mode cancelling signal S2 will be generated after a time interval t2 has elapsed, whose value is determined by timer circuit 152. The correction mode signal S1 will thereby be cancelled and the correction mode terminated.

The generation of a series of unit correction signals, by repeated actuations of correction switch 136 within short time intervals, will now be described. As explained above, an ON pulse P1 is generated when correction switch 136 is set ON, and shortly thereafter the correction mode signal S1 is generated, i.e. goes to the H level. If correction signal 136 is then set OFF, an OFF pulse P2 will then be generated by OFF differentiator circuit 142, and as a result, counting by timer circuit 152 will begin as described above and after a time interval t2 the correction mode cancelling signal S2 will go the H level. However, if correction switch 136 is once more set ON before the time interval t2 has elapsed, then another ON pulse, e.g. pulse P1b in FIG. 10(*b*), will be generated by ON differentiator circuit 140. This second ON pulse P1b, applied to the set input of RS-FF 146, has no effect on this flip-flop, which is already set. Thus, correction mode signal S1 continues to be output at the H level.

This second ON pulse P1b also acts to reset RS-FF 146. As a result, the $\overline{Q}$ output from RS-FF 146 goes from the L to the H level, whereby timer circuit 152 is forcibly reset (i.e. to a count of zero). Thus, a time delay t2 is again established before correction mode cancelling signal S2 will be generated, as timer circuit commences to count from a reset state. Thus, correction mode signal S1 is maintained at the H level, and the ON pulse P1b is transferred through AND gate 145, and through OR gate 158, to be output therefrom as a unit correction pulse P1b (shown in FIG. 10(*e*)) of correction input signal S4. If at this point correction switch 136 is set OFF, then as described hereinabove an OFF pulse P2 is generated by OFF differentiator circuit 142, and counting by timer circuit 152 begins. However, if correction switch 136 is again actuated shortly thereafter, before the time interval t2 determined by timer circuit 152 has elapsed, then another pulse of signal P1 will again be generated and will be output from OR gate 158 as a unit pulse of correction input signal S4. In this way, by first setting correction switch 136 to the ON state, and holding the switch in the ON state for a longer time than the interval t1, then correction mode signal S1 will be generated, setting the timepiece in the time correction mode. If correction switch 136 is then set OFF, and set ON again within the predetermined interval t2, and ON-OFF operations are thereafter repetitively performed at short time intervals, then each time correction switch 136 is set ON, a unit correction pulse will be output as correction input signal S4. Thereafter, if correction switch 136 is left in the OFF condition, then a final OFF pulse P2 will be generated whereby counting by timer circuit 152 will begin. After the predetermined interval t1, correction mode cancelling signal S2 will be generated, whereby correction mode signal S1 is cancelled. The timepiece is thereby returned to the normal time display mode.

A second mode of operation of correction control circuit 134 will now be described, in which rapid correction pulses are output as correction input signal S4. As described above with reference to the generation of unit correction pulses, correction mode signal S1 goes to the H level after a predetermined time interval t1, following correction switch 136 being set ON. If now correction switch 136 is set OFF, and then is once more set ON before the time interval t2 has elapsed, then as shown in FIG. 10(*e*), a unit correction signal pulse (e.g. P1b) will be output. If then correction switch 136 is left in the ON state, since RS-FF 148 is not reset, timer circuit 154 will continue to operate until the predetermined time interval t3 has elapsed, whereupon rapid correction timing signal S3 from timer circuit 154 goes to the H level. This signal enables AND gate 156, and as a result, clock pulses Sb are transferred through AND gate 156, and are output as a group of rapid correction pulses from OR gate 158, i.e. as correction input signal S4. Such a group of rapid correction pulses is designated by numeral 159 in FIG. 10(*e*).

If correction switch 136 is then set to the OFF state, then then as described hereinabove an OFF pulse P2 will be generated by OFF differentiator circuit 142, RS-FF 148 will be reset, and as a result output $\overline{Q}$ thereof will change to the H level. As a result, timer circuit 154 will be reset, so that rapid correction timing signal S3 will go the L level, thereby inhibiting AND gate 156. Output of rapid correction pulses from OR gate 158 as correction input signal S4 is thereby terminated.

Thus, as described in the last two paragraphs, the timepiece user can rapidly increment the contents of the minutes or hours counter circuit by holding correction switch 136 in the ON state after the time interval t3 described above has elapsed, to thereby generate a group of rapid correction pulses as correction input signal S4. When the desired degree of correction has been attained, the user need only set correction switch 136 to the OFF state, whereupon generation of rapid correction pulses will be terminated. In this way, if a relatively large amount of time correction is to be performed, the user need not carry out a large number of successive actuations of correction switch 136. On the other hand, if only a small amount of correction is to be accomplished, this can be most readily performed by generating unit correction pulses, through the procedure described previously.

Suitable values for the time intervals t1, t2 and t3 are in the range 1 to 5 seconds, approximately. In this embodiment, t1, t2 and t3 are all identical, and equal to 2 seconds.

Figure 11:
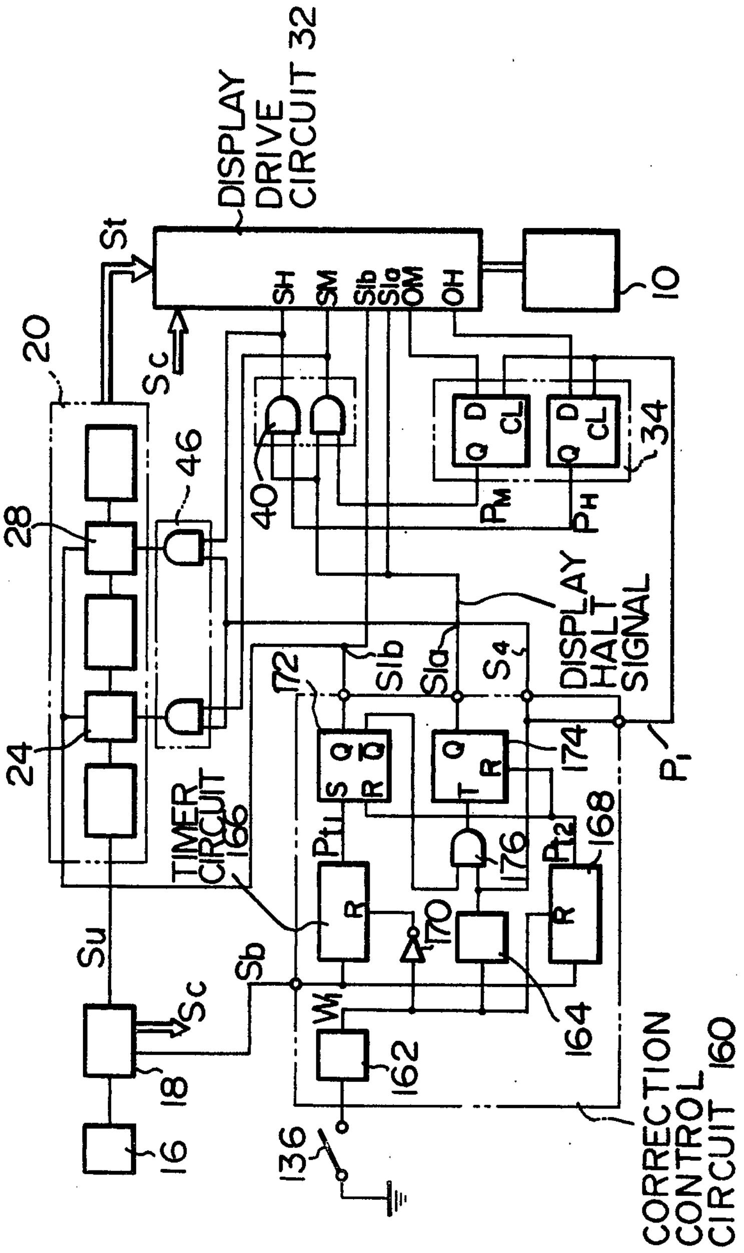
FIG. 11 is a block circuit diagram of a third embodiment of a digital electronic timepiece according to the present invention.

Referring now to FIG. 11, another embodiment of an electronic timepiece according to the present invention is shown in block circuit diagram form. Circuit blocks in FIG. 11 which are identical to those of the embodiment of FIG. 5 are designated by identical reference numerals, and will not be described further. The embodiment of FIG. 11 basically differs from that of FIG. 9 in that a different configuration is used for the correction control circuit, designated in this embodiment by numeral 160. In correction control circuit 160, numeral 162 denotes a switch bounce suppression circuit, for producing a signal W1 which varies with actuation of correction switch 136 in the same way as signal W1 of the embodiment of FIG. 9. An ON differentiator circuit 164 generates an ON pulse signal P1 in response to changeover of correction switch 136 from the OFF to the ON state. Two timer circuits 166 and 168 generate output signals Pt1 and Pt2 respectively, which go to the H level after predetermined time intervals following a reset input R being changed from the H to the L level, by counting pulses of a clock signal Sb which is output by frequency divider circuit 18. Timer circuit 166 reset terminal R is coupled through an inverter 170 to output signal W1 from switch bounce suppression circuit 162, whereby circuit 166 functions as an ON timer which is used to sense the duration for which correction switch 136 is held in the ON state. The timer circuit 168 has the reset terminal R coupled directly to the output of switch bounce suppression circuit 162, and serves to sense the duration for which correction switch 136 is left in the OFF state. An RS-FF 172 is set by signal Pt1 from timer circuit 166 and is reset by signal Pt2 from timer circuit 168. The correction mode signal S1 is generated from the Q output of RS-FF 172. A toggle-type flip-flop (referred to hereinafter as T-FF) 174 is provided with a reset terminal R which is coupled to the output of timer circuit 168. The toggle input T of T-FF 174 is coupled to the output of an AND gate 176, whose inputs are connected to the output from ON differentiator circuit 140 and the Q output of an RS-FF 172. When AND gate 176 is enabled, the Q output of T-FF174 is inverted upon successive pulses of ON signal P1, and signal S1a thus produced from T-FF 174 can be forcibly held at the L level by the output Pt2 from timer circuit 168 being at the H level.

The output signal S1b from the Q output of RS-FF 172, and signal S1a from T-FF 174 will be designated as the correction mode signal and the display halt signal respectively. The correction mode signal S1b and display halt signal S1a act in conjunction to perform the functions of correction mode signal S1 in the embodiment of FIG. 5 described above. Display halt signal S1a is supplied to display drive circuit 32, and to correction designation circuit 40, while correction mode signal S1b is supplied to display drive circuit 32 and to selector circuits 24 and 28 of timekeeping circuit 20.

The correction operation of the embodiment of FIG. 11 will now be described. When correction control circuit 160 is in the non-operative mode, then RS-FF 172 and T-FF 174 are both held in the reset state, so that display halt signal S1a and correction mode signal S1b are at the L level, while the $\overline{Q}$ from RS-FF 172 is held at the H level. As a result, AND gate 176 is in the enabled state. If now correction switch 136 is set ON, then output signal W1 from switch bounce suppression circuit 162 will go from the L to the H level, and an ON pulse signal P1 is thereby output by ON differentiator circuit 164 on the rising edge of signal W1. ON pulse signal P1 is transferred through AND gate 176, and also activates display mode memory circuit 34 to memorize the current display state (minutes or hours) as described for the embodiment of FIG. 5. At the same time, the output from AND gate 176 acts to invert the Q output from T-FF 174, so that display halt signal S1a goes to the H level. In addition, signal W1 resets timer circuit 168, and also acts through inverter 170 to enable counting by timer circuit 166 to begin. If correction switch 136 is then held in the ON state, signal Pt1 will go to the H level after a predetermined time interval, thereby setting RS-FF 172. As a result, correction mode signal S1b goes to the H level.

If in this condition correction switch 136 is set to the OFF state, then timer circuit 166 will be reset, and in addition the reset state of timer circuit 168 will be cancelled, and counting by that circuit will begin. If correction switch 136 is then held in the OFF state, then after a predetermined interval has elapsed, output signal Pt2 will be generated at the H level. This signal acts to reset RS-FF 172, and T-FF 174, and as a result, the display halt signal S1a and correction mode signal S1b return to the L level.

If on the other hand correction switch 136 is set OFF when correction mode signal S1b is at the H level, but is then set ON before signal Pt2 is output at the H level, and thereafter is actuated ON and OFF rapidly and repetitively, then each ON actuation of correction switch 136 will cause timer circuit 168 to be reset, and will also result in a correction pulse being output as correction input signal S4. The latter pulses, output from ON differentiator circuit 164, are blocked from passing through AND gate 176, since output signal $\overline{Q}$ from RS-FF 172 is at the L level.

In this condition, display halt signal S1a acts on display drive circuit 32 to set the correction mode thereof, as described above for the embodiment of FIG. 5, whereby the digits (minutes or hours) selected by display mode memory circuit 34 are displayed in a stationary manner on display device 10. If correction mode signal S1 is at the H level, then the correction input signal S4 pulses will be transferred by selector circuit 24 or 28 into either the minutes counter 26 or hours counter 30 (depending upon the condition of display mode memory circuit 34. Correction of the time information thus displayed in stationary form can then be accomplished by repetitive brief actuations of correction switch 136.

Thus, with the embodiment of FIG. 11, with the timepiece in the normal time display mode, with display shifting taking place, setting of correction switch 136 briefly to the ON state and back OFF, will result in display halt signal S1a going to the H level, whereby display drive circuit 32 sets the currently displayed digits, either minutes or hours, into a stationary display state. The correction mode has not yet been entered, however, since timekeeping signals are still being transferred through selector circuits 24 and 28 of timekeeping circuit 20. In this state, another brief actuation of correction switch 136 back ON and OFF will set display halt signal S1a to the L level, whereby display drive circuit 32 restores the normal shifting time display mode. If on the other hand correction switch 136 is set ON and held in that state for a sufficiently long interval that signal Pt1 goes to the H level, then correction mode signal S1b will also go to the H level, as will as display halt signal S1a, thereby establishing the time correction mode in which correction input signal S4 is transferred through selector circuit 24 or 28 of timekeeping circuit 20. The correction mode signal S1 is input to display drive circuit 32, so that the correction mode can be indicated by flashing of the stationary displayed digits, or flashing of the identification mark (M or H). This indicates that time correction can now be performed by first setting correction switch 136 OFF, and by thereafter performing repetitive brief ON-OFF actuations of that switch, with a correction pulse being produced on each switch actuation. Upon completion of the desired correction, correction switch 136 is left in the OFF state, and the timepiece will then return to the normal shifting time display mode after a predetermined time interval has elapsed.

Another embodiment of an electronic timepiece according to the present invention will now be described, with reference to FIG. 12. Here, a standard frequency oscillator circuit 16 produces a signal which is input to frequency divider 18, for thereby generating a unit time signal Su and a timing clock signal Sc. Unit time signal Su is counted by timekeeping circuit 20, whereby time information signals St are generated, and input to a display drive circuit 180. Numeral 200 denotes an extrnally actuatable display loop changeover switch. In display drive circuit 180, numeral 182 denotes a timing signal generating circuit which counts the pulses of standard timing signal Sc to produce a display changeover timing signal Sx0 which acts to perform alternation between a shifting display state and a fixed display state (as described for the other embodiments described above). This display state alternation is carried out with a predetermined period.

In this embodiment, timing signal generating circuit 182 comprises a base-32 counter circuit, which generates output signals Sx0 and Sx3. Signal Sx0 is input to a display information changeover timing circuit 184, which acts to designate changeover between a shifting display state and a fixed display state, in accordance with the level of display timing signal Sx0. Numeral 186 denotes a time display information designating circuit which receives as input the time information signals St from timekeeping circuit 20, and processes these information signals in accordance with the time information digits, and generates signals representing a particular digit as designated by signal Sx6 from display information changeover timing circuit 184. A numeral ROM circuit 57 stores numeral patterns corresponding to each digit, and outputs signals representing the display patterns of numerals designated by time display information designating circuit 186. Numeral 190 denotes a decorative pattern selection circuit which acts to select a page of a decorative pattern display, as designated by display information changeover timing circuit 184. Numeral 192 denotes a decorative pattern ROM circuit which stores decorative patterns and outputs signals representing specific decorative patterns when required. A display changeover circuit 194 selects either time information numerals or decorative patterns for display, under the control of display information changeover timing circuit 184. A drive circuit 196 provides drive signal to display unit 11, in accordance with display pattern signals transferred through display changeover circuit 194, synchronous with display timing signal Sx0. Numeral 198 denotes a decorative shape loop display designating circuit, which designates changeover from a first loop display mode (described hereinafter) to a second loop display mode in which each of a number of decorative shapes are successively and cyclically displayed. In the first loop display mode, the normal shifting time display alternates with a fixed display of a decorative shape. Changeover from the first to the second loop display mode is performed in accordance with actuation of display loop changeover switch 200.

Figure 12:
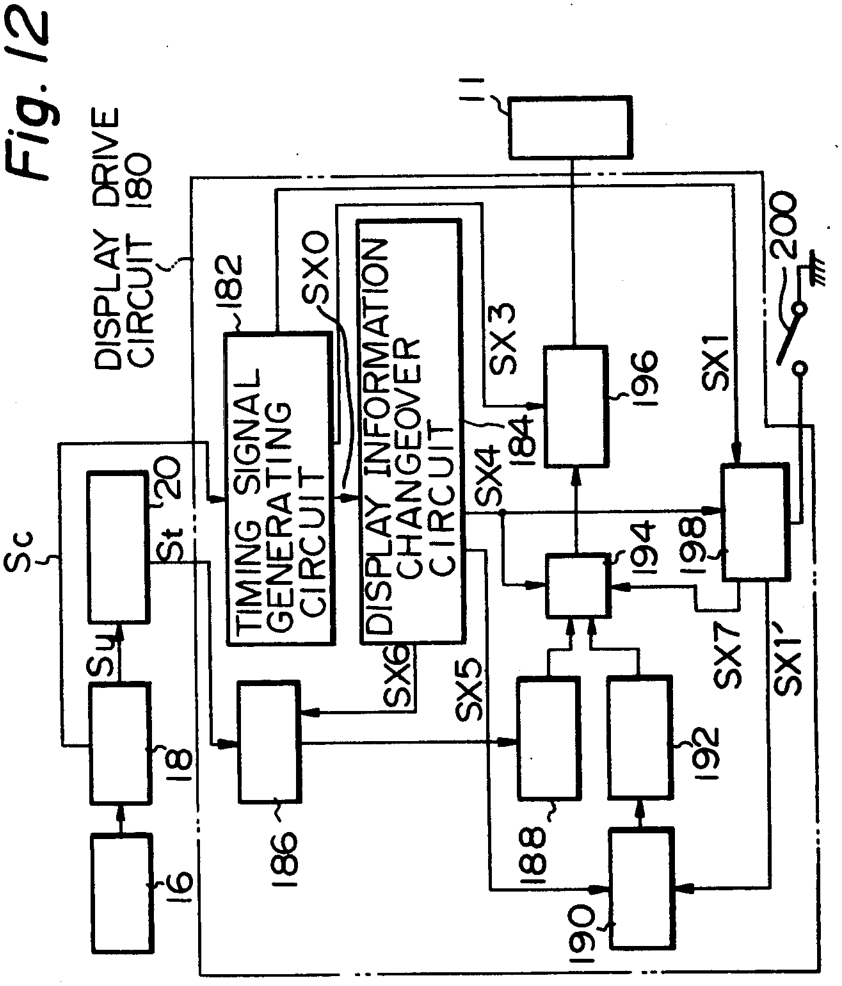
FIG. 12 is a block circuit diagram of a fourth embodiment of a digital electronic timepiece according to the present invention.

The configuration of display until 11 is identical to that of the embodiment of FIG. 5 described above, shown in FIG. 1 and FIG. 2, except for the fact that in the embodiment of FIG. 12, time display section 12 comprises a dot matrix array of 8 rows by 9 columns.

The operation of the digital electronic timepiece of FIG. 12 will now be described. The first loop display mode referred to above will first be described. Output signals from timing signal generating circuit 182 act to divide the display period into 32 steps, and controls the application of display changeover timing signal Sx0 to display information changeover timing circuit 184. The timing signal generating circuit 182 also acts to synchronize the shifting of time information digits on the display with these 32 steps, and generates a standard display timing signal Sx3 which serves to control the fixed display condition. In addition, timing signal generating circuit 182 produces a display timing signal Sx1, when the timepiece is in the decorative loop display mode. The display information changeover timing circuit 184 produces two sets of timing signals. The set corresponding to steps 1 to step 26 serves to transfer the output signals from numeral ROM 188, to produce the shifting time information display. The set corresponding to steps 27 to 32 serve to transfer the output signals from decorative shape ROM 192 to produce a fixed display of a decorative shape. For this purpose, display information changeover timing circuit 184 produces changeover signal Sx4, which controls display changeover circuit 194, and signal Sx5 which is applied to decorative shape selection circuit 190 in order to select one decorative shape page during each display period, i.e.

once in every 32 steps, and a signal Sx6 which designates the information which is to be output from time display information designating circuit 186 in the time display condition, this designation being performed once for each step 1 to step 26. The time display information designating circuit 186 sequentially outputs information specifying each time digit, in accordance with signal Sx6 from display information changeover timing circuit 184 and outputs display pattern signals for each of the numerals to be displayed, from numeral ROM 188.

The output signals from numeral ROM 188 are transferred through display changeover circuit 194 and are input to drive circuit 196, which responds by performing sequential display shifting of the time information digits in synchronism with standard timing signal Sx3, on display unit 11. While this is occurring, display timing signal Sx0 from timing signal generating circuit 182 is advanced, one step at a time. When step 27 has reached, display changeover circuit 194 transfers the output signals from decorative shape ROM 192, in response to changeover signal Sx4 from display information changeover timing circuit 184. At the same time, signal Sx3 acts through drive circuit 196 to establish a fixed display condition, whereby a fixed display of a decorative shape pattern is formed on display unit 11, in accordance with the output signals from decorative shape ROM 192. As successive pulses of display changeover timing signal Sx0 occur, and step 1 is returned to after step 31, then the shifting time display state is once more initiated, and signal Sx5 is output by display information changeover timing circuit 184. This signal acts to advance a count in decorative shape selection circuit 190. As a result, a change is made to a new decorative shapepage of decorative shape ROM 192, and thereafter signals are output from this ROM representing a different decorative shape pattern.

Thus, as described above, timing signal generating circuit 182 acts to produce a shifting time display condition and a fixed decorative shape display condition during the 32 steps of one display period. During each display period, a shifting time display and then a fixed display of a new decorative shape pattern appear in succession. The above is a description of the operation in the first loop display mode.

With the timepiece in the first loop display mode described above, if display loop changeover switch 200 is actuated then the second loop display mode will be entered, in which only decorative shapes are displayed. The operation in this loop will now be described. While the timepiece is in the first loop display mode, changeover signal Sx4 from display information changeover timing circuit 184 is input to decorative shape loop display designating circuit 198. This changeover signal Sx4 designates the timing at which fixed display of a decorative shapeis to occur, and the timing at which display of shifting time information is to occur. If display loop changeover switch 200 is actuated while changeover signal Sx4 is in a state which designated display of a fixed decorative shapepattern, then signal Sx7 will be output by decorative shape loop display designating circuit 198. This designation signal Sx7 establishes a condition in which only signals from decorative shape ROM 192 are transferred th rough display changeover circuit 194. At the same time, loop display timing signala St is output from decorative shape loop display designating circuit 198 as signal St', and this signal acts to cause periodic changeover of the decorative shape patterns, being supplied to decorative shape selection circuit 190. In other words, signals from decorative shape loop display designating circuit 198 now control the timepiece operation such that only output signals from decorative shape ROM 192 are transferred through display changeover circuit 194 in response to designation signal Sx7, and thereafter a count value held in decorative shape selection circuit 190 will be advanced periodically, in response to signal Sx1'.

As a result of this count state advancement of decorative shape selection circuit 190, the pages of the decorative shape patterns output from decorative shape ROM 192 are changed periodically, in succession. The timepiece is now in the second loop display mode, with decorative shape patterns being changed at periodic intervals. In this mode, if display loop changeover switch 200 is once more actuated, then a signal from this switch causes decorative shape loop display designating circuit 198 to terminate the output of signal Sx7 and signal Sx1', and the first loop display mode will be reentered.

Thus as described above, actuation of display loop changeover switch 200 enables selection of a first loop display mode in which a shifting time display condition alternates with display of a fixed decorative shape pattern, and a second loop display mode in which only decorative shape patterns appear, these patterns being changed sequentially.

Figure 13:
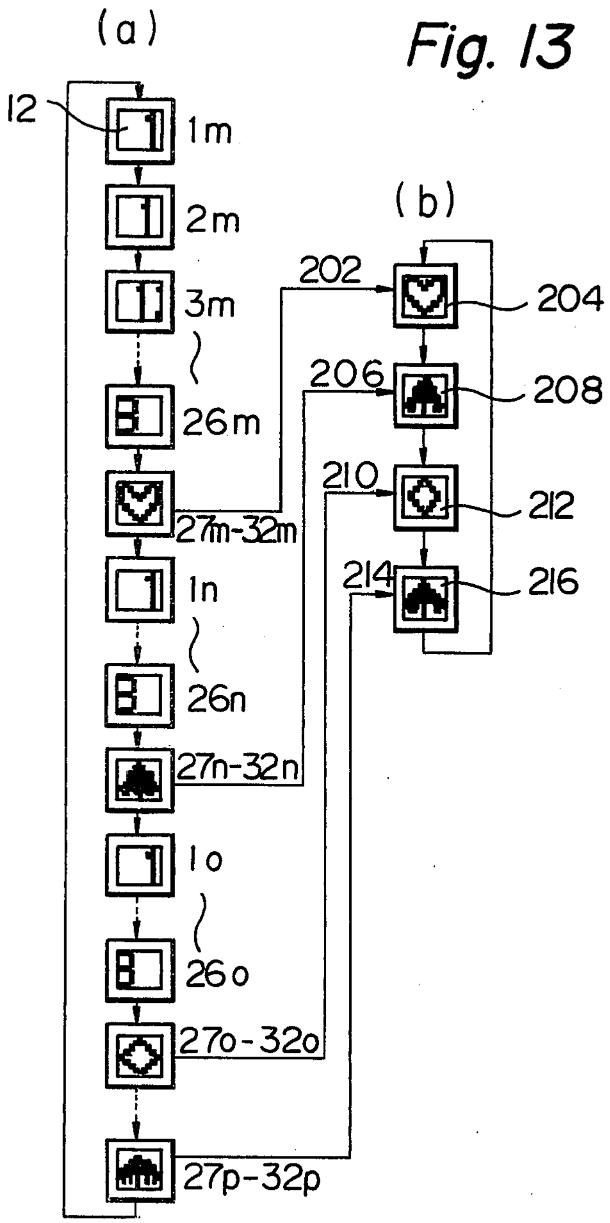
FIG. 13 is a diagram for illustrating two display loop conditions of the embodiment of FIG. 12.

These loop display modes will now be described with reference to the example of FIG. 13. FIG. 13(*a*) shows an example of the first loop display mode, as successive patterns appear on display unit 11, while FIG. 13(*b*) illustrates the second loop display mode. The numerals 1, 2, . . . in FIG. 13(*a*) denote successive display steps, corresponding to successive count states of timing signal generating circuit 182 as described above, while the letters m, n, . . . appended to each numeral designate the display period. Thus, if it is assumed that the current time information is 12 hours 58 minutes (12:58), then in the first step 1*m* of period m, the tens of hours digit 1 will appear. In the next step of the period m, i.e. step 2*m*, the numeral 1 will have moved one column to the right, and in the third step 3*m*, the units of hours digit 2 will begin to appear. In this way, shifting display of all of the time information 12:58 will be completed by the 26th step, step 26*m*. In the interval from step 27*m* to 32*m*, a decorative shape pattern in the form of a heart is fixedly displayed, as shown in FIG. 13.

Display period n is then entered, in which shifting display of time information occurs from step 1*n* to 26*n*. Thereafter, from steps 27*n* to 32*n*, a decorative shape in the form of a club is fixedly displayed, (i.e. the playing card "clubs" pattern).

Similarly during the next display period o, a shifting time display from steps 1*o* to 26*o* occurs, with display of a diamond decorative shape fixedly appearing from steps 27*o* to 32*o*, and during display period p thereafter, a shifting display of time information is followed by fixed display of the "spade" decorative shape. The display period m first described above is then re-entered.

In this way, a plurality of decorative shapes are displayed in an alternating and cyclically repeated manner, with the display of each decorative shape pattern being preceded by a shifting display of time information, in the first loop display mode illustrated in FIG. 13(*a*).

If display loop changeover switch 200 is actuated at a point in a display period in which fixed display of a decorative shape pattern is occurring, i.e. during any of the time intervals 27*m* to 32*m*, 27*n* to 32*n*, 27*o* to 32*o*, or 27*p* to 32*p*, then timepiece operation will change to the second loop display mode, in which only decorative shape patterns appear. For example, if display loop changeover switch 200 is actuated during the time interval corresponding to steps 27*k* to 32*k* of period k in the first loop display mode, i.e. while the heart decorative shape appears on the display, then as indicated by numera 202 in FIG. 13(*a*), the display will remain as the heart decorative shape for a predetermined time interval, then will change to the spade decorative shape. After the predetermined time interval, this will change to the diamond shape, which will be fixedly displayed for the predetermined time interval, to be followed by the spade decorative shape. The heart decorative shape is then once more displayed. Thus, in the second loop display mode, the decorative shape patterns of the first loop display mode are displayed successively, in a cyclically repeated loop, with each pattern appearing fixedly during a predetermined time interval.

If display loop changeover switch 200 is actuated while the timepiece is in the second loop display mode, then the first loop display mode will be re-entered. For example, if display loop changeover switch 200 is actuated while the club decorative shape is being displayed, in the second loop display mode, then the first loop display mode will be entered beginning from fixed display of the club shape, e.g. as indicated by numeral 206 in FIG. 13.

The present invention has been described in the above with reference to embodiments in which only hours and minutes of time information are displayed. However it should be noted that a digital electronic timepiece according to the present invention can also be arranged to display other time information, e.g. seconds, year, month, date, and weekday information. An individual identification mark can be assigned to each of the information units displayed, as in the case of the H and M markers used for the hours and minutes digits information in the described embodiments.

Furthermore, although individual identification marks, e.g. H and M have been used in the above embodiments to identify different categories of information, it should be noted that various other methods of information identification can be adopted. For example, the hours digits may be made different in size from the minutes digits, or may be formed in different shapes from the minutes digits. Such methods are believed to be equivalent to the use of individual identification marks as described for the preferred embodiments.

From the above description,, it can be understood that a digital electronic timepiece according to the present invention is provided with a matrix type of display device having a display range which is limited to approximately one and one half display digits during a normal time display mode in which time information is continuously shifted laterally over the display face, with identification means such as identification marks appearing on the display to indicate the category of information currently being shifted accross, e.g. minutes or hours information. As a result, a digital electronic timepiece according to the present invention can provide a clearly legible display of time information using a display device of very small size, for example of the order of 10 mm square.

Furthermore, with a digital electronic timepiece according to the present invention, the shifting display of time information, with identification means being provided to indicate the category of information currently being shifted across the display, can also be used as means for selecting a category of time information to be corrected. As described hereinabove, actuation of a switch can be arranged to cause information, such as two digits of minutes or hours information currently being shifted across the display, to be set into a fixed display state. The user can then perform switch actuations to perform correction of the information thus fixedly displayed. Such a method of selecting time information for correction has the advantage of being easy and convenient for the user to accomplish. However it also has the very important advantage, for a highly miniaturized timepiece, that this time correction can be performed using a minimum number of external operating members. In fact, as shown by one of the embodiments above, such correction can be arranged to be carried out using only a single pushbutton switch for both selection of information to be corrected and for input of correction data.

For the above reasons, a digital electronic timepiece according to the present invention can be made very small in size, and yet due to being very simple in its mechanical construction, with a minimum number of external operating members, can be economically manufactured.

Furthermore, as described above, a digital electronic timepiece according to the present invention can be provided with means for establishing a first display condition, in which display of a decorative shape pattern alternates with a shifting time information display, and a second display condition in which various decorative shape patterns are sequentically and cyclically displayed. Such a timepiece is therefore highly suited in incorporation into a pendant, ring or other accessory, of novel and attractive type.

From the preceding description, it will be apparent that the objectives set forth for the present invention are effectively attained. Since various changes and modifications to the above construction may be made without departing from the spirit and scope of the present invention, it is intended that all matter contained in the above description or shown in the accompnaying drawings shall be interpreted in an illustrative and not in a limiting sense. The appended claims are intended to cover all of the generic and specific features of the present invention.

What is claimed is:

1. A digital electronic timepiece, comprising:

a source of a standard frequency signal;

frequency divider circuit means for frequency dividing said standard frequency signal to provide a unit time signal;

timekeeping circuit means for counting said unit time signal to produce time information signals corresponding to current time information;

a display device comprising a time display section formed of a dot matrix array of display elements; and display drive circuit means comprising numeral conversion circuit means for converting said time information signals into first digit pattern signals representing numeric patterns corresponding to digits of said time information, display range limiting circuit means for processing said first digit pattern signals into second digit pattern signals, said second digit pattern signals representing said time information digits within a predetermined limited display range, display shifting circuit means for sequentially shifting said second digit pattern signals, and row and column electrode drive circuit means responsive to said sequentially shifting digit pattern signals for generating display drive signals to drive said display device to provide on said time display section a shifting display of time information within said display range;

said display device further comprising an identification mark display section operable to selectively display a plurality of identification marks indicative of categories of time information, and in which said display shifting circuit means produces signals indicative of a category of time information currently appearing on said time display section, and in which said display drive circuit means further comprises identification mark changeover circuit means responsive to said information category indicating signals for driving said identification mark display section to display an identification mark indicative of said currently displayed information category.

2. A digital electronic timepiece according to claim 1, in which said time information comprises a plurality of information categories, including at least a minutes category and an hours category, with each of said categories being represented by at least two digits, and in which said display range is limited by said display range limiting circuit means to an extent which is greater than one digit and less than two digits.

3. A digital electronic timepiece according to claim 2, in which said display range corresponds to approximately one and one-half digits.

4. A digital electronic timepiece according to claim 1, and further comprising externally actuatable correction designation switch means and correction control circuit means coupled thereto, said correction control circuit means being responsive to actuation of said correction designation switch means for generating a correction designation signal, and in which said display drive circuit means further comprise circuit means responsive to said correction designation signal for providing a stationary display of time information on said time display section of said display device.

5. A digital electronic timepiece according to claim 4, in which said stationary display of time information comprises two digits representing a time information category indicated by said identification mark at the moment of generation of said correction designation signal.

6. A digital electronic timepiece according to claim 6, in which digits appearing in said stationary display of time information are of smaller size than digits appearing in said shifting display of time information.

7. A digital electronic timepiece according to claim 6, and further comprising externally actuatable correction input switch means, and in which said correction control circuit means is responsive to actuation of said correction input switch means for generating a correction input signal, and moreover comprising correction input selector circuit means controlled by said display drive circuit means for selectively transferring said correction input signal to said timekeeping circuit means such as to modify the contents of a time information category indicated by said identification mark at the moment of generation of said correction designation signal.

8. A digital electronic timepiece according to claim 8, in which a single correction switch performs the functions of both said correction designation switch means and said correction input switch means, with said correction control circuit means being responsive to a predetermined initial manipulation of said correction switch for establishing a correction mode of operation of said timepiece, and being responsive to subsequent manipulations of said correction switch during said correction mode for generating said correction input signal.

9. A digital electronic timepiece according to claim 1, in which said display drive circuit means further comprise decorative shape pattern generating circuit means for generating signals representing at least one decorative shape, and dispaly information changeover circuit means for controlling said display drive circuit to selectively generate display drive signals corresponding to said decorative shape representing signals for thereby providing a stationary display of said at least one decorative shape on said time display section of said display device, and drive signals corresponding to said sequentially shifting digit pattern signals, for thereby providing said shifting display of time information on said time dispaly section.

10. A digital electronic timepiece according to claim 9, in which said display drive circuit means are controlled by said display information changeover circuit means to produce said drive signals such that said shifting display of time information and said stationary display of said at least one decorative shape appear in repetitive alternation on said time display section.

11. A digital electronic timepiece according to claim 10, in which said decorative shape pattern generating circuit means is operative to sequentially and cyclically generate signals representing each of a plurality of different decorative shapes, and in which said display information changeover circuit means control said display drive circuit such that said drive signals produce said shifting display of time information in alternation with stationary display of successive ones of said plurality of decorative shapes.

12. A digital electronic timepiece according to claim 11, and further comprising externally actuatable decorative shape loop changeover swtich means and decorative shape loop display designating circuit means, said decorative shape loop display designating circuit means being responsive to actuation of said decorative shape loop display changeover swtich means for establishing, in cooperation with said display information changeover circuit means, a first loop display mode of time information appears on said time display section in alternation with stationary display of successive ones of said plurality of decorative shapes, and a second loop display mode of operation in which each of said plurality of decorative shapes is successively and cyclically displayed in stationary form on said time display section of said display device during a predetermined time interval.

* * * * *